US010451160B2

United States Patent
Roberts

(10) Patent No.: US 10,451,160 B2
(45) Date of Patent: Oct. 22, 2019

(54) DIFFERENTIAL

(71) Applicant: Anthony David Roberts, Bungador (AU)

(72) Inventor: Anthony David Roberts, Bungador (AU)

(*) Notice: Subject to any disclaimer, the term of this patent is extended or adjusted under 35 U.S.C. 154(b) by 0 days.

(21) Appl. No.: 15/571,664

(22) PCT Filed: May 6, 2016

(86) PCT No.: PCT/AU2016/050329
§ 371 (c)(1),
(2) Date: Nov. 3, 2017

(87) PCT Pub. No.: WO2016/176737
PCT Pub. Date: Nov. 10, 2016

(65) Prior Publication Data
US 2018/0149252 A1 May 31, 2018

(30) Foreign Application Priority Data
May 6, 2015 (AU) .................................. 2015901633

(51) Int. Cl.
*F16H 48/27* (2012.01)
*F16H 48/08* (2006.01)
*F16H 48/40* (2012.01)

(52) U.S. Cl.
CPC ............. *F16H 48/27* (2013.01); *F16H 48/08* (2013.01); *F16H 48/40* (2013.01)

(58) Field of Classification Search
CPC .......... F16H 48/27; F16H 48/28; F16H 48/08; F16H 48/24; F16H 48/26; F16H 48/40
See application file for complete search history.

(56) References Cited

U.S. PATENT DOCUMENTS 2,627,190 A 2/1953 Bottcher
3,229,550 A * 1/1966 Nickell .................. F16H 48/08
475/88

(Continued)

FOREIGN PATENT DOCUMENTS

| JP | S6162642 A | 3/1986 |
| JP | 5118394 A | 5/1993 |

OTHER PUBLICATIONS

International Search Report issued in PCT/AU2016/050329 dated Jun. 15, 2016, 4 pages.

(Continued)

*Primary Examiner* — Charles A Fox
*Assistant Examiner* — Lori Wu
(74) *Attorney, Agent, or Firm* — RatnerPrestia

(57) ABSTRACT

A continuously variable differential gear comprising: a pair of rotating bevel gears engaged with one another via a pinion gear, each of the bevel gears including a first operating surface; an actuator, opposing ends thereof having a pair of interconnected fluid reservoirs, the actuator comprising a pair of secondary operating surfaces; the pair of rotating gears and the pinion gear being housed within the actuator such that the first operating surfaces of the bevel gears and the secondary operating surfaces of the actuator are cooperatively engaged, wherein relative rotation between the pair of bevel gears imparts a linear motion to the actuator thereby varying the pressure between the pair of interconnected fluid reservoirs to resist the linear motion of the actuator and thereby variably dampen relative motion of the bevel gears to each other.

18 Claims, 17 Drawing Sheets

(56) References Cited

U.S. PATENT DOCUMENTS

| | | | | |
|---|---|---|---|---|
| 3,490,312 | A | * | 1/1970 | Dehart .................... F16H 48/08 |
| | | | | 192/103 F |
| 3,724,289 | A | | 4/1973 | Kennicutt |
| 4,721,405 | A | * | 1/1988 | Loberg ...................... F16D 1/00 |
| | | | | 285/386 |
| 6,168,545 | B1 | * | 1/2001 | Lowell .................... F16H 48/08 |
| | | | | 475/231 |
| 6,505,722 | B1 | * | 1/2003 | Ganthev ................. F16H 48/18 |
| | | | | 192/48.8 |

OTHER PUBLICATIONS

Written Opinion of the International Searching Authority issued in PCT/AU2016/050329 dated Jun. 15, 2016, 4 pages.
Supplementary European Search Report issued in European Patent Application EP 16 78 8963, dated Feb. 13, 2019, 10 pages.

* cited by examiner

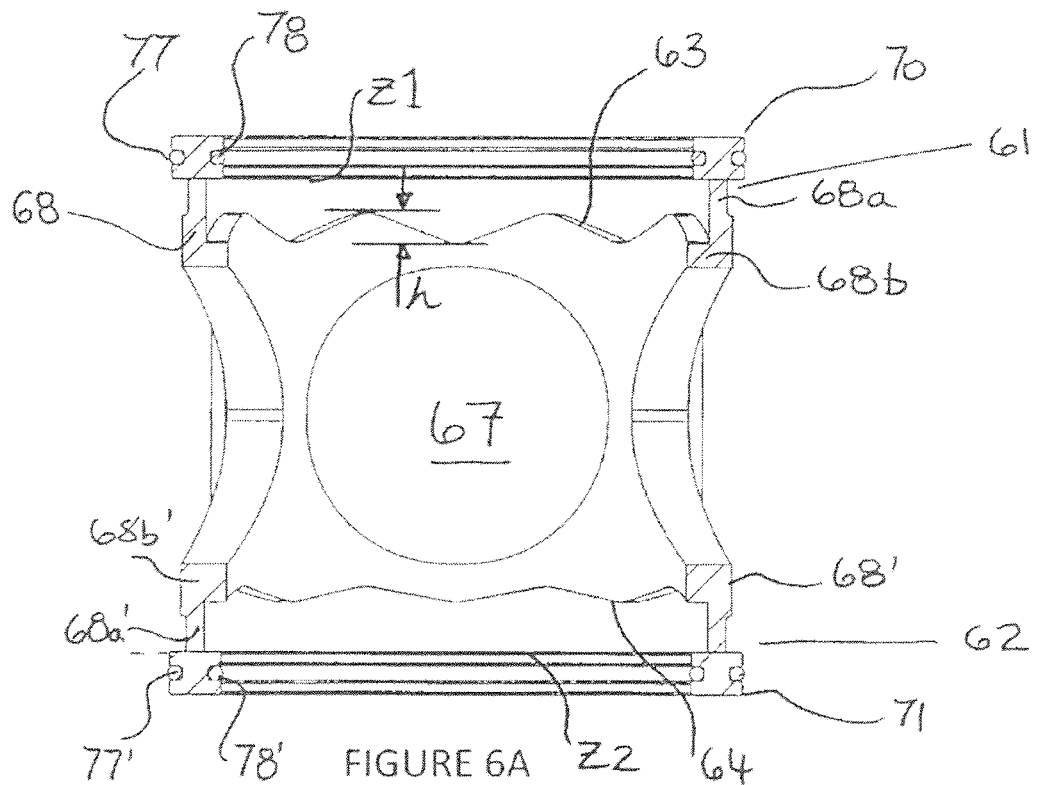
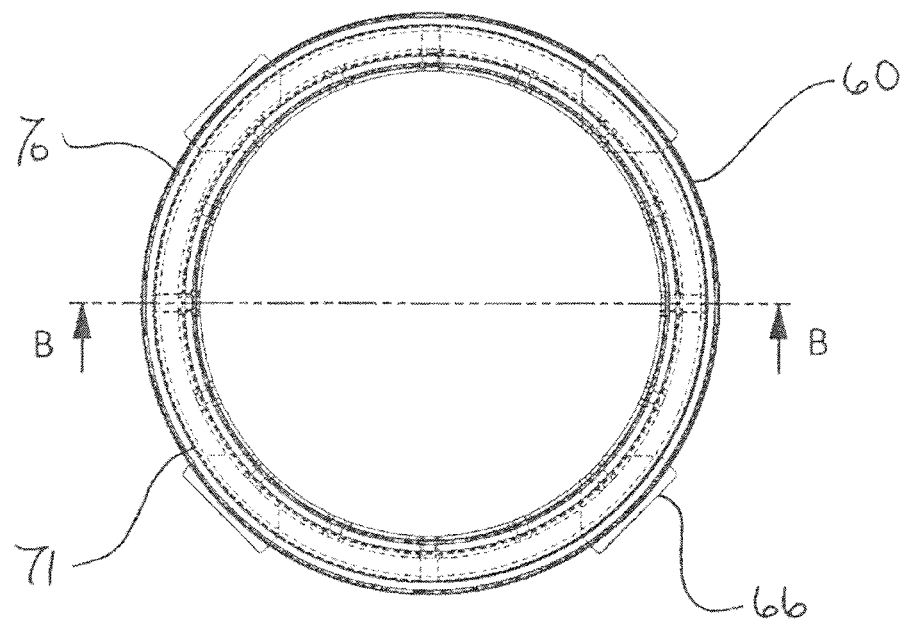
FIGURE 6

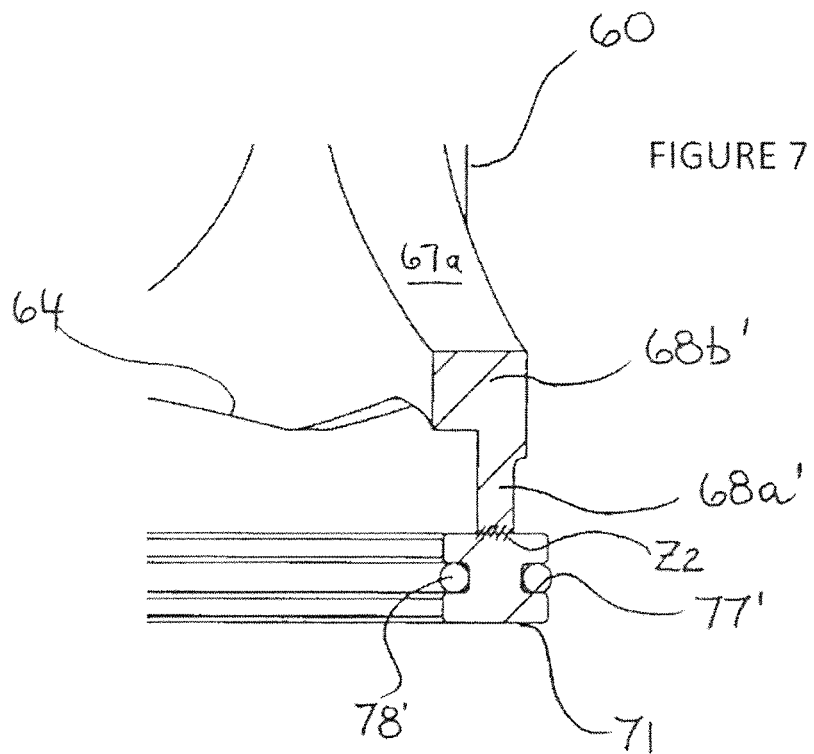
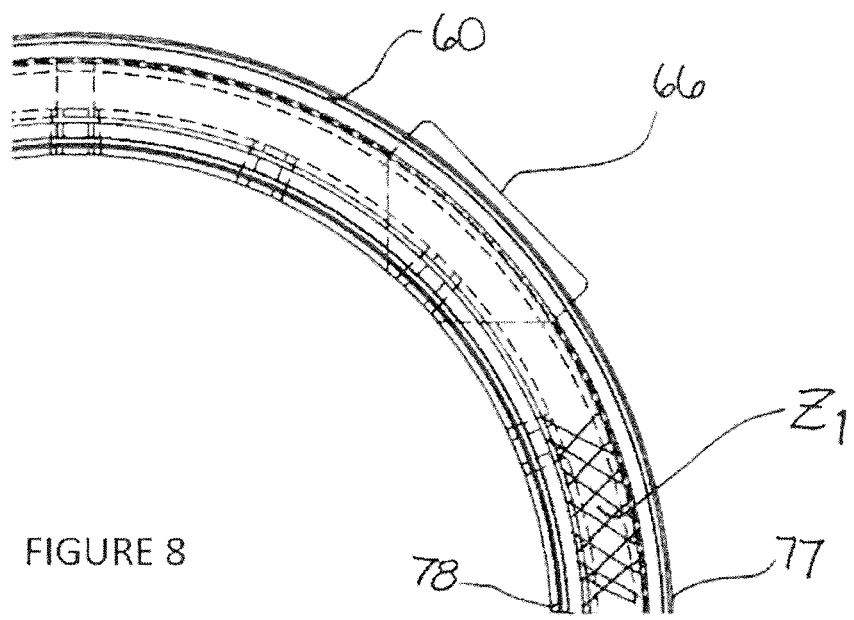

DIFFERENTIAL

CROSS REFERENCE TO RELATED APPLICATIONS

This application is the U.S. National Phase Application of PCT/AU2016/050329, filed May 6, 2016, which claims priority to Australian Patent Application No. 2015901633, filed May 6, 2015, the contents of such applications being incorporated by reference herein.

TECHNICAL FIELD

This invention relates to the field of differentials for motor vehicles and other machines. Specifically, the invention relates to a differential of a motor vehicle to adjust torque distribution under different driving conditions.

BACKGROUND

A differential is used to distribute torque between two interconnected rotating shafts. A specific, everyday use, of a differential is on a motor vehicle where a left and a right axle of the vehicle are rotatably connected via a differential.

When a vehicle turns a corner the outer wheels of the vehicle must travel further than the wheels on the inner side of the vehicle, as the turning arc is longer farthest from a turning centre. To accommodate this turning requirement, the outer wheels of a vehicle are accelerated proportionally to the inner wheels being decelerated, thereby allowing the vehicle to turn a corner whilst maintaining all four wheels in rolling contact with a road surface. Without a differential either the outer wheels will travel too slowly or the inner wheels will travel too fast, either or which will result in poor, unpredictable handling characteristics of the vehicle, loss of traction, and tyre damage.

The differential is the gearing unit that proportionally increases the speed of the outer wheel and decreases the speed of the inner wheel by equally distributing torque simultaneously between the axle of the outer wheel and the axle of the inner wheel.

Vehicle differentials are found between the rear wheels of a rear wheel drive vehicle, effectively splitting a single rear axle into left and right rear axles, respectively coupled to the left and right rear wheels. Differentials can also be disposed between the front wheels of a vehicle often in conjunction with a gearbox as a "transaxle", and in some cases intermediary to a first and a second differential, such as a transfer box.

The differential is typically driven directly, or indirectly, by the prop shaft of the vehicle and utilises a hypoid gear pair. The first gear of the hypoid pair is a pinion gear connected to the prop shaft and the second gear of the hypoid pair is a ring gear or crown gear mounted to a carrier of the differential gear set.

Although a road vehicle relies on the differential to maintain good handling and control for on road driving, there are times when a vehicle is driven off-road or when the road conditions become poor, such that the equalising of torque between the two interconnected wheels is not wanted.

For example, when the road becomes icy one or both the inner and outer wheel of a vehicle may lose traction (or grip). However, when only one wheel loses traction, the vehicle may become stuck. An open differential distributes torque equally to the inner and the outer wheel. The torque is applied until the wheel exceeds a maximum traction, the traction being a factor of the downforce on the wheel and the frictional coefficient of the surface upon which the wheel is contacting. If one wheel is sitting on ice, the friction of the surface is very low, thus significantly dropping the traction of the wheel, accordingly, very little torque is required to make the wheel spin. As the differential splits torque evenly, the amount of torque distributed to both wheels is limited by the traction threshold of the ice-bound spinning wheel. As such, both the wheels connected to the differential are significantly limited in power, thus the vehicle becomes stuck until the friction under the spinning wheel is increased.

The above, loss of traction situation, is overcome by having a vehicle with a straight axle joining the left and right wheels. As there is no equalising of torque between the two wheels, loss of traction on one wheel will redistribute the torque delivered to the adjacent wheel. However, a straight axle (beam axle or dead axle) will not be capable of turning a corner without dragging the wheels of the vehicle. Furthermore, a straight axle cannot maintain even road contact over uneven road surfaces. The same effect is achieved by closing or locking a differential, so that the left and right axles are locked together and turn synchronously.

In light of the above there are a range of available differentials, some with complex clutch systems that "limit" the distribution of torque in a wheel spin situation, so that torque is redirected to the non-spinning wheel thereby assisting the vehicle to free itself. These are often referred to as limited-slip differentials. These are primarily "open" differentials with the capability of allowing the left and right axle to vary in angular velocity to one another and limit the extent of the variance ie they lock or "close" the differential when the difference in angular velocity between the two axles exceeds a limit or threshold.

Some differentials are configured to be selectively activated ie turned on or off on demand. These are referred to as "lockers". Lockers; therefore, provide either an open differential or a closed differential. They can be manually actuated by a switch or alternatively, they can use complex internal electrical and mechanical systems to assess the terrain and assess when the differential requires locking.

In light of the above, it is always desirable to provide a new differential to address or ameliorate the limitations described above or to at least provide a useful alternative.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

SUMMARY

The invention provides a differential gear for a differential for distributing torque between a left axle and a right axle of a motor vehicle, comprising: a carrier adapted to receive a crown wheel, the carrier having a cavity, a first reservoir at a first end thereof, and a second reservoir at a second end thereof, the first reservoir in fluid communication with the second reservoir such that fluid can flow between the first reservoir and the second reservoir in response to movement of an actuator; a first bevel gear located at the first end of the carrier for connection to one of the left or right axles, the first bevel gear having a first operating surface circumferentially disposed around an outer face thereof, and a second bevel gear connected to the other of the left or the right axle having a second operating surface circumferentially disposed around an outer face thereof; a pinion gear housed within the cavity, the pinion gear meshingly engaged with the first bevel gear at the first end of the carrier and meshingly engaged with the second bevel gear at the second end of the carrier, for meshingly interconnecting the first bevel gear and the second bevel gear; and the actuator being located within the cavity, the actuator configured to house the first and second bevel gear and the pinion gear, the actuator having a first reaction surface at a first end and a second reaction surface at a second end, the first operating surface of the first bevel gear being configured to cooperatively engage with the first reaction surface of the actuator, and the second operating surface of the second bevel gear being configured to cooperatively engage with the second reaction surface of the actuator; wherein when the operative surfaces of the first and second bevel gears cooperatively engage with the first and second reaction surfaces of the actuator, in response to relative unsynchronised rotation of the first and second bevel gears with respect to one another, the actuator reciprocates between a first position and a second position, wherein the reciprocating motion of the actuator is dampened by the movement of fluid between the first and the second reservoirs, thereby impeding the relative rotation of the first and second bevel gears relative to each other.

The cammed surfaces on each of the bevel gears and each end of the actuator cooperate, such that unsynchronised rotation of the first bevel gear, relative to the second bevel gear imparts linear motion to the actuator, causing the actuator to reciprocate between the bevel gears. The reciprocating motion of the actuator and resulting motion thereof forces fluid from the first fluid reservoir to the second fluid reservoir via a channel/conduit. The cross-sectional area of the conduit impedes the fluid flow rate therethrough, thereby damping the linear movement (and the reciprocating motion) of the actuator and thus the rotation of the side bevel gears.

As the two bevel gears synchronously rotate, the actuator remains stationary within the cavity of the carrier. When the two bevel gears start to rotate out of synch with one another a linear motion is imparted to the actuator varying the pressure in either of the first or second reservoir forcing fluid from the first fluid reservoir to the second fluid reservoir or vice versa.

When the fluid is forced from the first reservoir to the second reservoir at a slow rate, the cross-sectional area of the conduit that connects the first and second reservoirs does not impede the flow of fluid. The outcome: the stiffness of the differential gear remains unchanged.

When the fluid is forced from the first reservoir to the second reservoir at a higher rate of flow, the fluid flow is restricted and thus impeded by the cross-sectional area of the conduit. This impedance, in turn, damps the linear motion of the actuator thereby impeding the relative motion between the bevel gears (resisting the bevel gears from spinning out of synch with one another). The outcome: the stiffness of the differential increases in proportion to the impedance within the conduit.

In one embodiment, fluid displacement from the first to the second reservoir travels along the conduit via an aperture, the aperture thereby controls the rate that the fluid moves from the first to the second reservoir (or vice versa) the smaller the aperture the more impedance is imparted to the fluid in the conduit thereby increasing the damping effect on the differential gear; reducing the relative slip between the bevel gears; and reducing the rotation of the axle connected to the bevel gear that increased in angular velocity. By controlling the cross-section of the conduit via the aperture, the stiffness of the differential gear is variably adjusted. The controllable aperture can be a valve. Electronic variation of the valve via a solenoid arrangement or other electronic circuit will allow the stiffness of the differential gear to be selectively adjusted from inside the driver's cabin when the vehicle is in motion.

Furthermore, the aperture (valve) can be closed completely, thereby inhibiting fluid transfer between the first and second reservoir and consequently locking or "closing" the differential gear, effectively fixing the left and right axle to rotate synchronously with each other.

A differential according to the invention will provide a self-adjusting stiffening mechanism: the more the wheel slips, the faster the side bevel gear will try to turn, the higher the resulting impedance from the fluid conduit. As such the differential gear provides a continuously variable stiffness in direct response to the road/terrain conditions on which the vehicle is travelling.

Furthermore, the differential gear stiffness relies on physics and not electrical based components to provide the advantages recited herein, thus improving the ruggedness of the differential and reducing the sensitivity to damage when in use. The differential of a vehicle is typically packaged under the floor and is exposed to dirt and shock loading in extreme driving conditions. The more complex and delicate the mechanism, the higher the possibility of damage and the more costly the repair. As the differential gear of the present invention does not rely on friction based mechanisms such as clutch plates or the like to vary or lock the differential gear, the differential gear is less susceptible to component wear. This reduced sensitivity to component wear provides a differential gear with a longer working life and further reduces the replacement of consumable components and maintenance of the differential gear.

The actuator may comprise a pair of pistons, a first piston disposed at the first end of the actuator and a second piston disposed at the second end of the actuator.

Each of the first and second pistons may be at least partially housed within the first and second fluid reservoirs, respectively.

The first and second pistons may be configured to seal the first and second reservoirs, respectively. The pistons may be annular. The pistons may each include a seal. The pistons may have an H-shaped cross-section. The H-shaped cross-section of each piston may be configured to house at least one sealing member.

The carrier may comprise a body, a first end cap and a second end cap. At least one of the two end caps may be threadingly engageable with the body.

The first fluid reservoir may be disposed within the first end cap of the carrier and the second fluid reservoir is disposed within the second end cap of the carrier. Each of the fluid reservoirs may be cylindrical. Each of the fluid reservoirs may be a cylinder. The first and second fluid reservoirs may be connected by a conduit. The conduit may comprise a plurality of channels fluidly communicating between the first and second fluid reservoirs. The plurality of channels may be equidistantly spaced around the carrier. The plurality of channels may extend through an outer wall of the carrier. A valve may be disposed between the first reservoir and the second reservoir to control the rate at which fluid travels between the first and second reservoirs. The valve may be closable to prevent fluid from flowing between the two reservoirs. The valve may be electronically or electrically controllable.

The first and second reaction surfaces of the actuator may be formed on an internal shoulder of the actuator. The first operating surface of the first bevel gear may be disposed circumferentially around an outer face of the first bevel gear and the second operating surface of the second bevel gear may be disposed circumferentially around an outer face of the second bevel gear. The first and second bevel gears may be housed substantially within the actuator thereby bringing the reaction surfaces of the actuator into mating contact with the operating surfaces of the respective bevel gears.

The pistons may be substantially the same diameter as the actuator such that each opposing end faces of the actuator abut the pistons providing a load path therebetween.

The differential gear may comprise two pinion gears meshingly interposed between the first and second bevel gears. The differential gear may comprise four pinion gears meshingly interposed between the first and second bevel gears, equidistantly.

The differential gear may further comprise a mount configured to support a pinion gear within the actuator. The mount may be configured to support a plurality of pinion gears in a predetermined spatial relationship. The mount may include a plurality of supports upon which the plurality of pinion gears are mounted. The supports may be constrained to the mount.

The actuator may be substantially cylindrical to house the first and second bevel gears and at least one pinion gear therein. The actuator may comprise at least one aperture in a sidewall thereof in which the pinion gear is partially disposed. The pinion gear may extend at least partially through the sidewall of the actuator. The aperture may be over-sized to allow reciprocating motion of the actuator around the pinion gear.

An internal wall of the carrier may be configured to conform to an exterior face of the pinion gear.

The fluid may be automatic transmission fluid (ATF). The fluid may flow between the first reservoir and the second reservoir within a closed hydraulic system.

The carrier may further comprise a magnetic field generator for imposing a magnetic flux onto the fluid.

The magnetic field generator may be located at a distal end of the carrier. The magnetic field generator may be located within a central region of the carrier. The magnetic field generator may be located within an end cap of the carrier.

The magnetic field generator may entirely encircle the carrier. The magnetic field generator may partially encircle the carrier. The magnetic field generator may comprise a plurality of magnetic field generators disposed at predetermined, discrete locations around the body of the carrier.

The fluid may be a magnetorheological fluid (also referred to as an electrorheological fluid). The magnetorheological fluid when subjected to a magnetic field may change in viscosity. The viscosity of the magnetorheological fluid may be increased when in proximity to a magnetic field.

The magnetic field generator may be a coil, a solenoid, an electromagnet or other magnetic field generating device. The magnetic field generator may be actuable to selectively engage and disengage the magnetic field. The actuator may be configured to adjust the strength of the magnetic field generated, to thereby adjust the viscosity of the working fluid in response to the magnetic field strength. The magnetic field generator may be electronic or electrical. The magnetic field generator may be actuated by electrical cable connecting the magnetic field generator to a power source via electrical wires or cable.

The carrier may further comprise a mount at each end thereof to support the differential gear within a differential housing.

The invention further provides a differential for a motor vehicle, the differential comprising: a differential gear as described above, having an external gear mounted to the carrier of the differential gear, wherein the differential gear and connected external gear are housed within a differential housing, the external gear being configured to cooperate with a drive means of the motor vehicle.

The invention further provides a method of replacing a differential gear in a motor vehicle, the method comprising the steps of: (a) removing the differential gear from a differential housing of the vehicle; (b) installing a continuously variable differential gear comprising: a pair of rotating bevel gears engaged with one another via a pinion gear, each of the bevel gears including a first operating surface; an actuator, opposing ends thereof having a pair of interconnected fluid reservoirs, the actuator comprising a pair of secondary operating surfaces; the pair of rotating gears and the pinion gear being housed within the actuator such that the first operating surfaces of the bevel gears and the secondary operating surfaces of the actuator are cooperatively engaged, wherein relative rotation between the pair of bevel gears imparts a reciprocating motion to the actuator thereby varying the pressure between the pair of interconnected fluid reservoirs to resist the reciprocating motion of the actuator and thereby variably dampen relative motion of the bevel gears to each other.

The method may further comprise the step of removing the crown wheel from the differential carrier before removing the differential gears.

The method may further comprise the step of re-attaching the crown wheel to the differential carrier after installing the replacement differential gear.

The invention still further provides a continuously variable differential gear comprising: a pair of rotating bevel gears engaged with one another via a pinion gear, each of the bevel gears including a first operating surface; an actuator, opposing ends thereof having a pair of interconnected fluid reservoirs, the actuator comprising a pair of secondary operating surfaces; the pair of rotating gears and the pinion gear being housed within the actuator such that the first operating surfaces of the bevel gears and the secondary operating surfaces of the actuator are cooperatively engaged, wherein relative rotation between the pair of bevel gears imparts a linear motion to the actuator thereby varying the pressure between the pair of interconnected fluid reservoirs to resist the linear motion of the actuator and thereby variably dampen relative motion of the bevel gears to each other.

The varying pressure between the reservoirs may create an impedance to fluid flow between the reservoirs.

The first and second operating surfaces may be cammed surfaces. The term "cammed surface" is understood herein to include planar surfaces having regular protrusions or an irregular protrusion, such that motion of the cammed surface imparts objects in contact with the protrusion or protrusions with a rocking or reciprocating motion.

The actuator may comprise a pair of pistons, a first piston disposed at the first end of the actuator and a second piston disposed at the second end of the actuator.

Each of the first and second pistons may be partially housed within the first and second fluid reservoirs, respectively.

The continuously variable differential gear may further comprise a carrier, housing the pair of rotating bevel gears, pinion gear and actuator. The carrier may comprise a body, a first end cap and a second end cap.

The first fluid reservoir may be disposed within the first end cap of the carrier and the second fluid reservoir may be disposed within the second end cap of the carrier. The end caps may be threadingly engageable with the body.

The actuator may be substantially cylindrical to house the first and second bevel gears and at least one pinion gear therein. The fluid may circulate from the first reservoir to the second reservoir in a closed system.

The invention still further provides a differential for a motor vehicle, the differential comprising: a continuously variable differential gear as described above, the continuously variable differential gear having an external gear mounted thereto, wherein the continuously variable differential gear and external gear are housed within a differential housing, the external gear being configured to cooperate with a drive means of the motor vehicle.

Various features, aspects, and advantages of the invention will become more apparent from the following description of embodiments of the invention, along with the accompanying drawings in which like numerals represent like components.

BRIEF DESCRIPTION OF THE DRAWINGS

Embodiments of the invention are illustrated by way of example, and not by way of limitation, with reference to the accompanying drawings, of which:

FIG. 6 is an end view in wire frame of the actuator of FIG. 5, illustrating external guide ways;

FIG. 6A is a sectional view along line B-B of FIG. 6, illustrating internal cammed surfaces at a first and a second end of the actuator;

FIG. 7 is an enlarged portion of FIG. 6A, illustrating a contact zone between the actuator and a piston;

FIG. 8 is an enlarged wire frame view of a quadrant of the actuator of FIG. 6, illustrating a guide feature of the actuator;

DESCRIPTION OF EMBODIMENTS

The invention will now be described more fully hereinafter with reference to the accompanying drawings, in which various embodiments, although not the only possible embodiments, of the invention are shown. The invention may be embodied in many different forms and should not be construed as being limited to the embodiments described below.

Whist the differential gear 1 is described herein in relation to use with a motor vehicle, it is contemplated that the differential gear 1 is applicable to other mechanical devices where torque is distributed between multiple rotating shafts.

Figure 1:
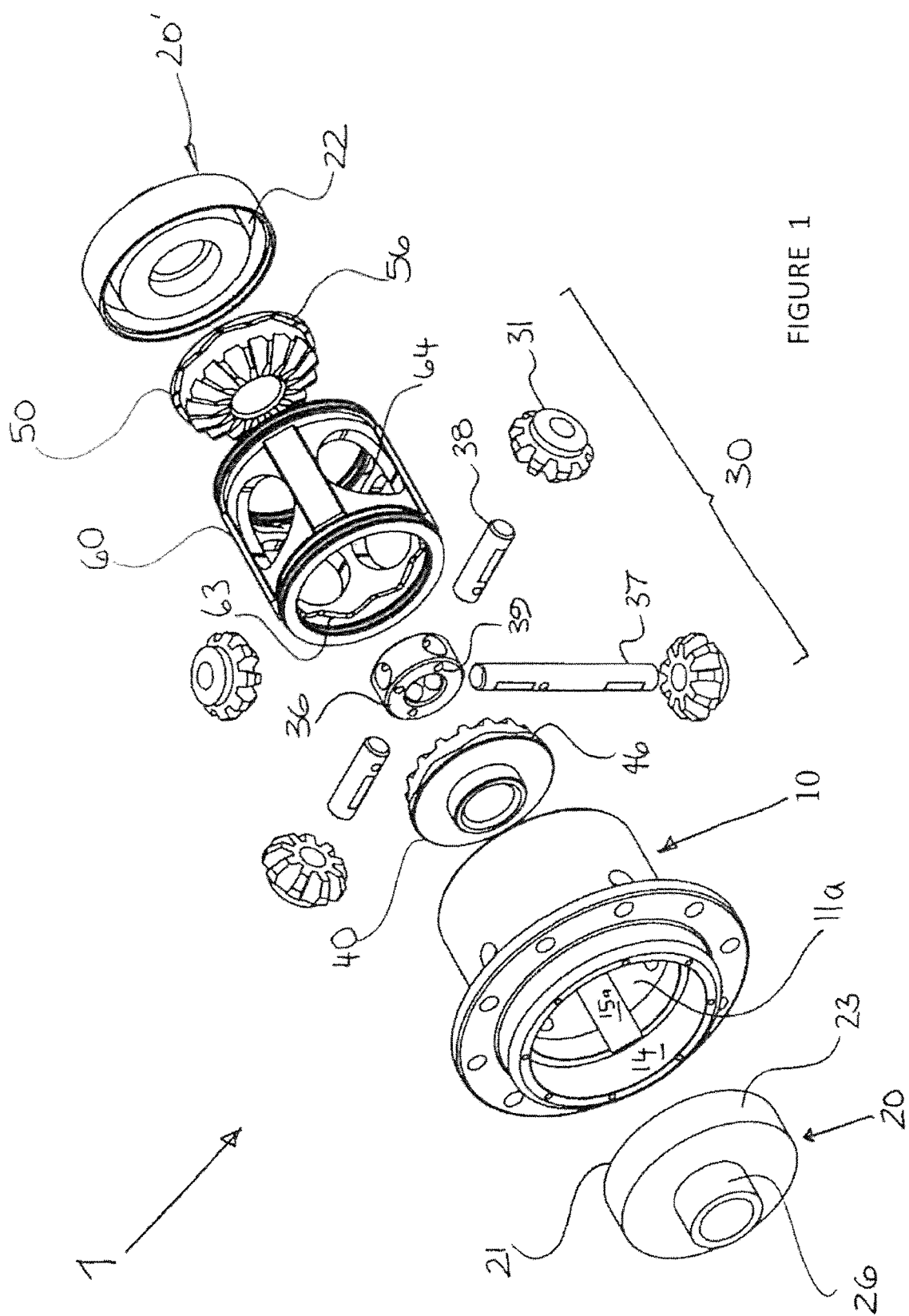
FIG. 1 is an exploded perspective view of a differential gear according to an embodiment of the invention illustrating the internal gears.

With reference to the FIG. 1, the components of a differential gear 1 are illustrated in accordance with one embodiment of the invention. The differential gear 1 is configured to distribute torque between a left axle and a right axle of a motor vehicle (not illustrated) and to continuously vary the stiffness of the differential in response to the terrain over which the vehicle is travelling. In order to provide this variable stiffness, the left axle of the vehicle is connected to a first side bevel gear 40 within the differential gear 1 and the right axle of the vehicle is connected to a second side bevel gear 50 within the differential gear 1.

Although FIG. 1 is exploded to provide a more detailed view of each component of the differential gear 1, when assembled, the first and second side bevel gears are housed within a cavity 15 of carrier 10.

The carrier 10 is adapted to receive a crown wheel (not illustrated). The crown wheel is bolted to the carrier 10 through a plurality of bolt holes 7 disposed circumferentially around a crown wheel mounting flange 6. The mounting flange 6 is externally disposed about a periphery of the carrier 10. The crown wheel provides a geared connection to the prop shaft of the vehicle, the prop shaft providing the power to drive the wheels from a crankshaft of an engine. A ring gear or alternative gear can be employed in place of a crown wheel.

The carrier 10 comprises a first reservoir, illustrated as a first gallery 21 disposed at a first end 12 thereof and a second reservoir, illustrated as a second gallery 22 disposed at a second end 13 of the carrier 10. The first gallery 21 and second gallery 22 are in fluid communication with each other such that fluid can flow between the first gallery and the second gallery in response to movement of an actuator 60 within the carrier 10.

The first bevel gear 40 is located at the first end 12 of the carrier 10 and is connected to the left axle. The first bevel gear 40 having a first operating surface 46 disposed around an outer face 42 thereof, and the second bevel gear 50 is connected to the right axle having a second operating surface 56 disposed around an outer face 52 thereof.

A pinion gear 31 is housed within the cavity 15, the pinion gear 31 meshingly engages with the first bevel gear 40 at the first end 12 of the carrier 10 and meshingly engages with the second bevel gear 50 at the second end 13 of the carrier 10, thereby meshingly interconnecting the first bevel gear 40 and the second bevel gear 50.

The actuator 60 is also located within the cavity 15 of the carrier 10. The actuator 60 is configured to house the first 40 and second bevel gears 50 and the pinion gear 31. The actuator 60 provides a first reaction surface 63 at a first end 61 and a second reaction surface 64 at a second end 62. When the differential gear 1 is assembled, the first operating surface 46 of the first bevel gear 40 is configured to cooperatively engage with the first reaction surface 63 of the actuator 60. Likewise, the second operating surface 56 of the second bevel gear 50 is configured to cooperatively engage with the second reaction surface 64 of the actuator 60. In this manner, the operative surfaces 46, 56 of the first 40 and second 50 bevel gears cooperatively engage with the first 63 and second 64 reaction surfaces of the actuator 60, converting unsynchronised rotation of the first bevel gear 40 relative to the second bevel gear 50, into linear movement of the actuator 60 between the first end 12 of the carrier 10 and the second end 13 of the carrier 10.

As the actuator 60 reciprocates across the carrier 10, either of the first end 61 or the second end 62 of the actuator 60 applies pressure to the fluid in either of the first 21 or the second 22 gallery. The increase in fluid pressure urges fluid to travel between the first 21 and the second 22 galleries wherein the reciprocating motion of the actuator 60 is dampened by the movement of the fluid between the first 21 and the second 22 galleries, thereby impeding the relative rotation of the first 40 and second 50 bevel gears relative to each other With the differential gear 1 described above, any slip at either of the left wheel or the right wheel will cause the first 40 or second 50 bevel gears to rotate non-synchronously. The greater the amount of slip the greater the pressure applied to one of the first 21 or second 22 galleries and the more fluid displaced between the two galleries. The faster the rate at which the fluid is displaced between the two galleries, the greater the damping effect (impedance) provided by forcing the fluid through a fixed channel 16, that fluidly connects the first 21 and the second 21 galleries. Accordingly, the more a wheel is slipping the stiffer the differential gear 1 becomes, thereby instantaneously reacting to the changes in terrain over which the vehicle is passing.

Turning now to FIGS. 2 to 17, the individual components of differential gear 1 will be described in more detail and their assembly within the carrier 10.

Figure 2:
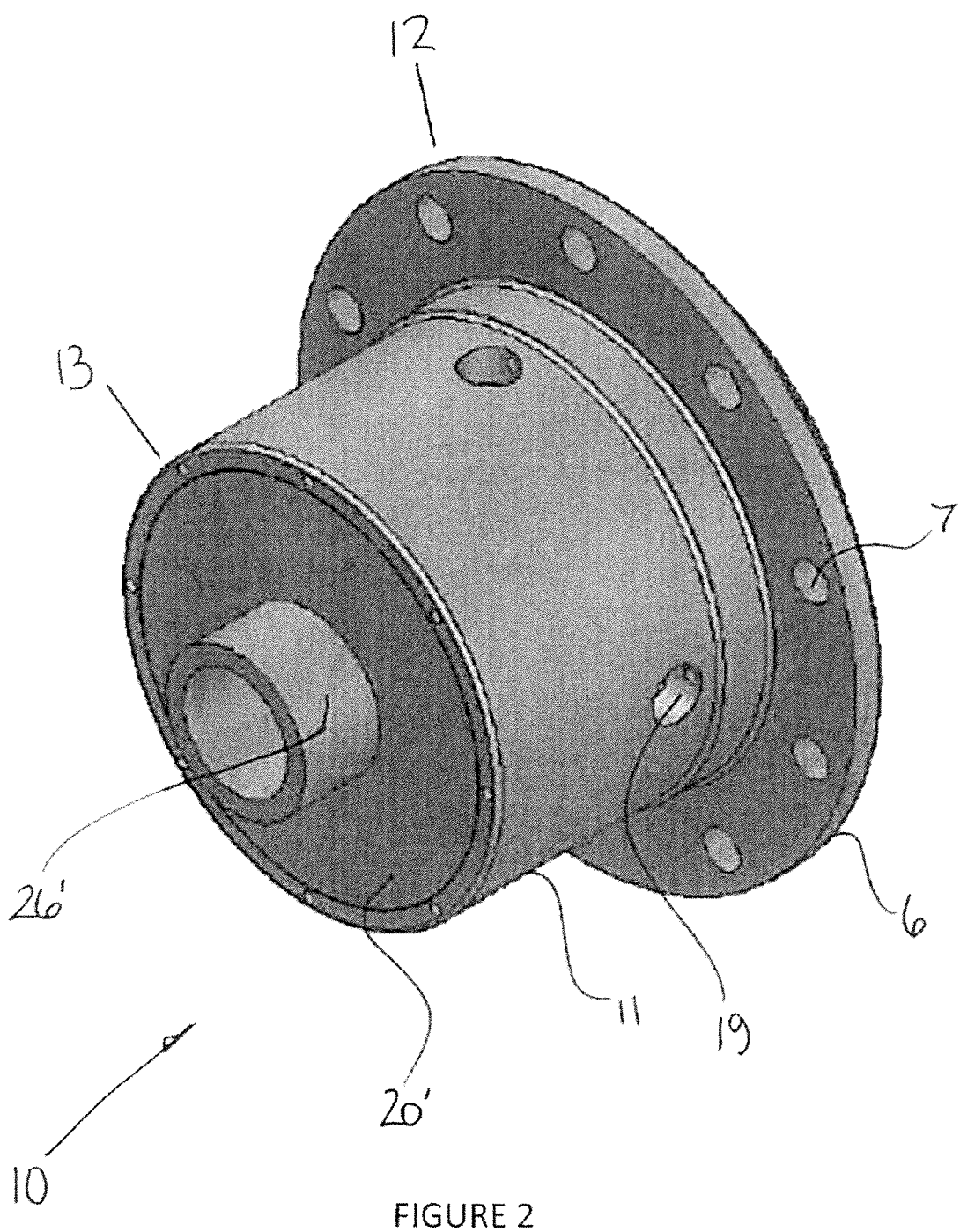
FIG. 2 is a perspective view of a housing of the differential of FIG. 1, illustrating a mounting flange for a crown wheel.

FIG. 2 illustrates carrier 10, which comprises a central housing 11 sealed at the first 12 and second 13 ends thereof with identical end caps 20, 20'. The housing 11 is not symmetrical as the crown wheel mounting flange 6 is disposed towards the first end 12. The mounting flange 6 may be located circumferentially around the external surface of the housing 11 at any location between the first end 12 and the second end 13 of the carrier 10 without affecting the functionality of the differential gear 1. The exact placement of the flange 6 in any particular embodiment will be influenced by the packaging of the vehicle drive-train, specifically the connection gear location at the end of the prop shaft.

The flange 6 need not be continuous. Furthermore, alternative mounting means can be employed for the crown wheel such as clips, pins, welding, screw threaded etc. The bolt holes 7 are ideally equidistantly spaced, circumferentially around the flange 7 to provide dynamic stability under rotational loading.

The carrier 10 is preferably made from steel or an alternative metal thus providing a strong and durable casing for the differential gear 1. When manufactured from steel or other suitable metals, the carrier 10 can be cast and machine finished to a high tolerance, thereby providing a dimensionally accurate component, both inside and out.

The carrier 10 is made from metal, however, it is contemplated that alternative composite materials could be used. The carrier 10 can be made from a steel or steel composite material, for example a 1045-steel (a medium tensile carbon steel). 1045 steel will typically exhibit an ultimate tensile strength of between 500 and 700 MPa. The carrier can also be made from SG iron or spheroidal graphite iron, a ductile form of iron, typically cast. SG iron is well suited to manufacturing the components of the differential gear 1, the carrier 10 and gears 40, 50, 31 as the nodular form of graphite within the material structure exhibits good resistance to linear cracking and allows the components to remain geometrically intact with reduced distortion. Once cast the carrier 10 and gears 40, 50, 31 can be machined to the required dimensions and tolerances accordingly. SG iron exhibits an ultimate tensile strength of between 350 to 900 MPa and a ductility of between 2 to 22%. The higher the ultimate tensile strength of the SG iron, the lower the ductility.

The housing 11 is illustrated to have a number of locating holes 19 for locating a pair of cross-shafts 37, 38 within the housing 11. A number of lubrication holes (not illustrated) can also be incorporated within the housing for lubricating the internal components of the differential gear 1. A differential is typically sealed, encasing the differential gear 1 and the ends of the left and the right axle of a vehicle therein so that the entire assembly can be continuously lubricated during use. The internal features of the housing 11 will be discussed later in this document in relation to the seating of the actuator 60 within the cavity 15, in conjunction with FIG. 11.

The external features of the end cap 20 are illustrated in FIG. 2. The end cap 20 having an end journal 26 for supporting the carrier 10 within a differential housing (not shown). The journal 26 is mirrored at each end of the carrier 10 to evenly support the carrier 10. The journals 26, 26' provide a smooth bearing mounting surface for use in installation of the carrier 10. The journal 26 is hollow having a large central aperture 27. The left axle of the vehicle is inserted into the aperture 27 to be connected with the first bevel gear 40 inside the cavity 15 of the carrier 10. Likewise the journal 26' provides a similar aperture 27' for enabling the right axle of the vehicle to be connected to the second bevel gear 50.

The end cap 20 is threadingly mounted to the housing 11. The end cap 20 has a threaded portion 29 which engages with a mating threaded portion 14 of the housing 11. This threaded connection provides a strong and releasable connection between the two components.

As torque is transmitted through the differential gear 1, the pinion gears push against the side gears, forcing the side gears against the end caps of the housing. Accordingly, as the torque increases so too does the force exerted onto the housing of the differential gear 1. Traditionally bolts have been used to secure an end cap onto a differential housing; however the threaded connection described herein provides an improved strength to the connection over a bolted solution.

A mechanical advantage is provided by using a screw over a bolt, as a screw thread provides greater contact and frictional resistance than the smooth shank of a bolt. Accordingly, the threaded connection between the cap 20 and housing 11 is strengthened to better withstand higher torque loads within the differential gear 1.

The housing 11 (and end caps 20) can be manufactured on a lathe and as such the tools required are readily available to cut a thread into an internal wall 11a of the housing 11, during the manufacturing process. The screw thread then becomes an integrated part of the housing 11 and end cap 20. This eliminates the need for connecting bolts and thus eliminates the potential to lose the bolts that connect the housing 11 and end cap 20 together. By employing a threaded connection between the housing 11 and end cap 20 the task of aligning the components before assembly is simplified as there are no discrete pairs of bolt holes to be aligned. By using a threaded connection and eliminating bolts (or other fasteners) a reduced parts count for the differential 1 is achieved, which further provides a weight saving. It is contemplated that this threaded connection between the housing 11 and one or both of the end caps 20 can be applied to a typical differential housing thereby providing all of the aforementioned advantages.

The screw thread 29 provides a stronger joint between the end cap 20 and the housing 11 than that of a bolted connection, capable of withstanding pressures of up to 20 MPa (3000 psi). As the screw thread 29 of end cap 20 engages with a mating thread 14, located internally of the carrier 10, there are minimal projections on the outside of the carrier 10, reducing the opportunities for snagging other components whist the carrier 10 is revolving rapidly. This threaded connection also uses the packaging space within the differential housing more efficiently. A reduction in mass of carrier 10 can provide valuable extra packaging space for larger bevel gears 40, 50 and larger pinion gears 31 making for a more robust and heavy duty differential gear 1.

Figure 3:
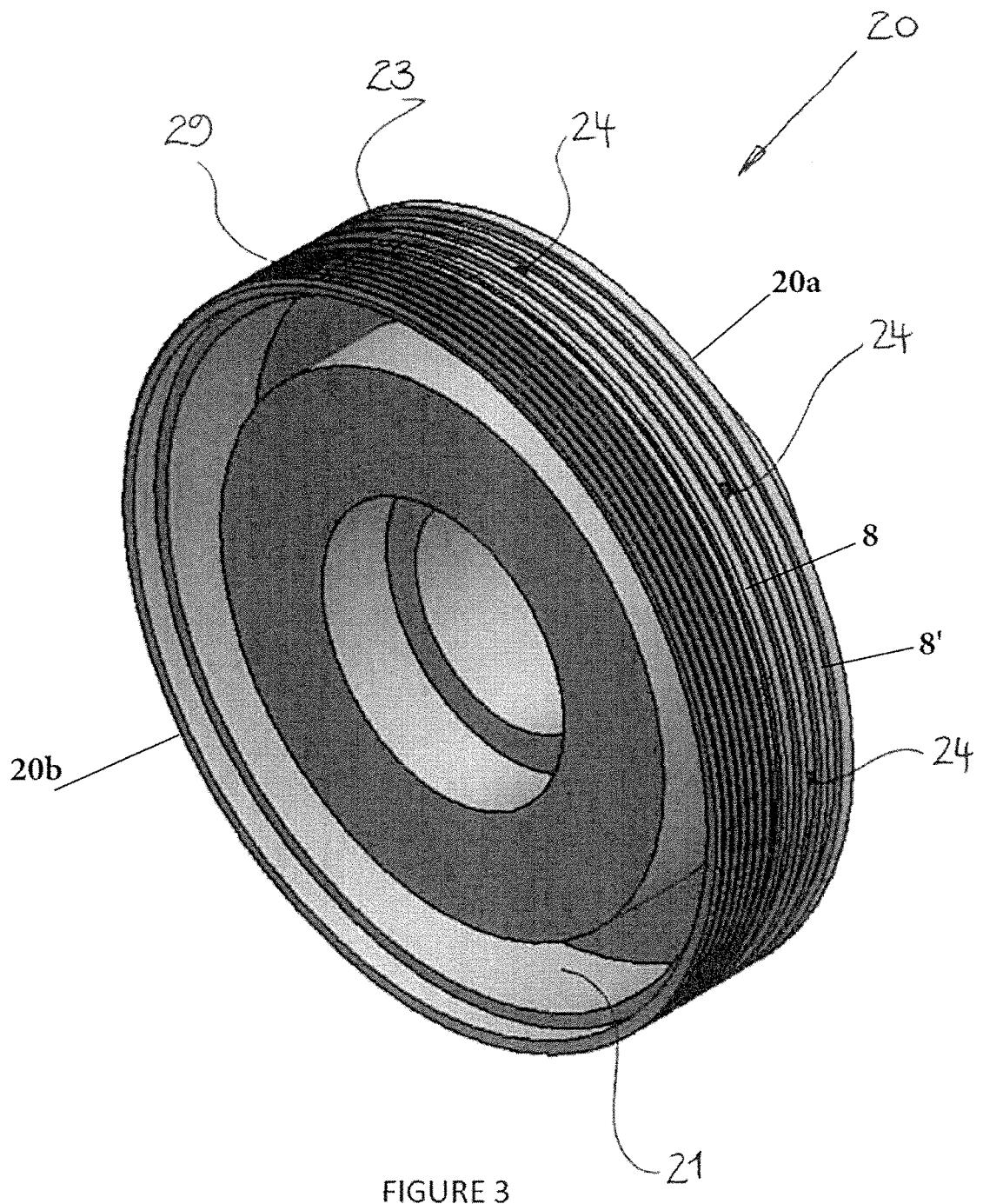
FIG. 3 is a perspective view of an end cap for sealing the housing of FIG. 2.

FIG. 3 illustrates the end cap 20 from inside the carrier 10. The central aperture 27 is clearly visible, where the left axle enters the differential gear 1. The first gallery 21 is shown as an annular recess or bore coaxially aligned with the central aperture 27, wherein the gallery 21 extends into the body of the cap 20. The gallery 21 extends through a substantial depth of the end cap 20 and is only accessible from within the carrier 11. The gallery 21 is sealed from the exterior of the differential gear 1.

This fluid gallery 21 provides a cylindrical chamber in which the actuator 60 is constrained to linearly move along, thereby applying pressure to fluid within the gallery 21.

The cap 20 has a peripheral external surface 23, about which the thread 29 is disposed. Also located on the surface 23 are a plurality of outlets 24 through which the fluid can be pushed into or drawn out of the first gallery 21. The plurality of outlets 24 are disposed on the surface 23 towards an outer facing edge 20a of the cap 20. The thread 29 is disposed on the surface 23 towards an inner facing edge 20b of the cap 20.

Figure 14A:
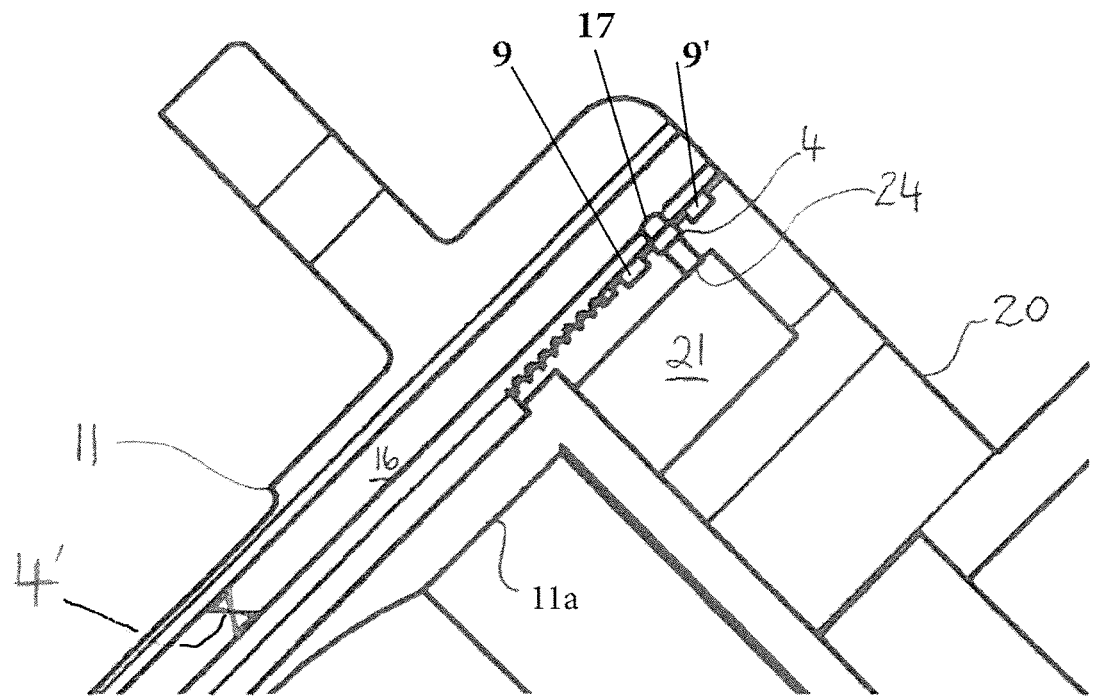
FIG. 14A is an enlarged view of FIG. 13 from inside the viewing pane, illustrating a fluid conduit extending from a fluid gallery at a first end of the differential gear.

On opposing sides of the outlets 24 (towards the inner facing edge 20b and the outer facing edge 20a) is provided an annular recess 8, 8'. On each side of recess 8 and recess 8' is formed a pair of side walls 8a,8b and 8a',8b' illustrated in FIG. 3. The recesses 8, 8' are each shaped to position and retain an end cap seal 9, 9' between the respective pairs of side walls 8a,8b and 8a', 8b' (illustrated in FIG. 4A). The end cap seals 9, 9' (illustrated in FIG. 14A) can comprise O-rings, sealant or gaskets being suitably resilient to seal the cap 20 to the housing 11 on opposing sides of the outlets 24. These end cap seals 9, 9' prevent the fluid from escaping the gallery 21 and internal conduits 16, and entering the cavity 15 of the housing 11. To assemble to end cap 20 to the housing 11, the seals 9, 9' are located on the surface 23 within their respective recesses 8, 8'. The cap 20 is the inserted into the housing 11. As the cap 20 is inserted into the housing 11 and the thread 29 engages with mating thread 14 of the housing 11, the seals 9, 9' are retained within their respective recesses 8, 8' and compressed against the side walls 8a,8b and 8a', 8b' to form a seal for retaining the fluid.

The second end cap 20' is identical to end cap 20 and provides a second fluid gallery 22 at the second end 13 of the carrier 10. The second end cap 20' further provides at least one outlet 24' for allowing fluid to enter and exit the second fluid gallery 22. The first 21 and second 22 fluid galleries are in fluid communication with each other via a fluid channel 16 that extends through the housing 11 (see FIG. 12A which illustrates a cross-sectional view of the housing 11, taken through a fluid channel 16). Once the end caps 20, 20' are screwed into place at either end of the carrier 10 the fluid channel 16 provides a conduit that allows fluid to flow from the first gallery 21 to the second gallery 22 and vice versa. This fluid system is sealed from other fluids, lubricants, coolants etc within the differential gear 1.

The fluid galleries 21, 22 can be filled with gas in some embodiments. The embodiment illustrated in FIGS. 1 to 17 is preferably filled with a liquid. Automatic transmission fluid (ATF) is one such fluid, which provides a good hydraulic working fluid with lubricating properties and anti-wear additives. Variants of ATF are also contemplated having corrosion inhibitors and surfactants which will increase the working life of the differential gear 1 by keeping the internal conduits 16 and galleries 21, 22 clean. It is further contemplated that the fluid used within the differential gear 1 can be customised by the additional of friction modifiers. The use of a higher friction fluid will modify the operation of the differential gear 1, as will be explained in more detail hereafter.

Figure 4A:
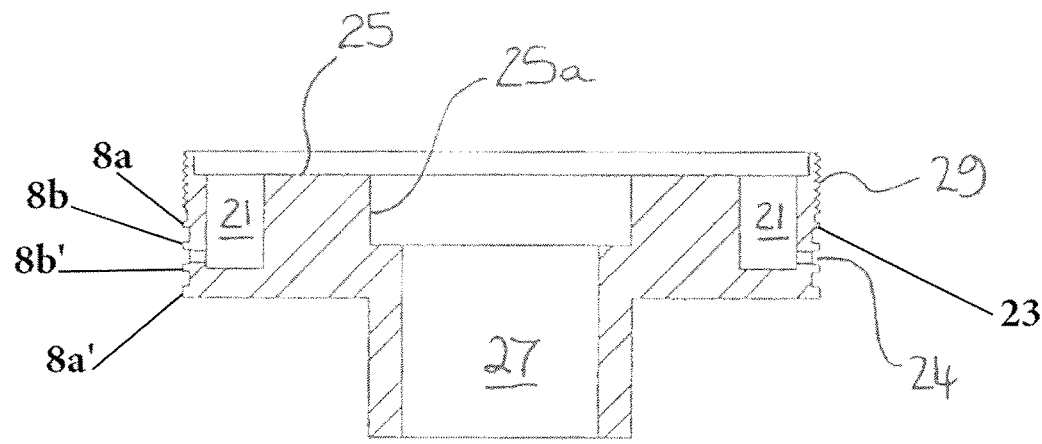
FIG. 4A is a sectional view along line A-A of FIG. 4, illustrating the annular gallery therein.
Figure 4:
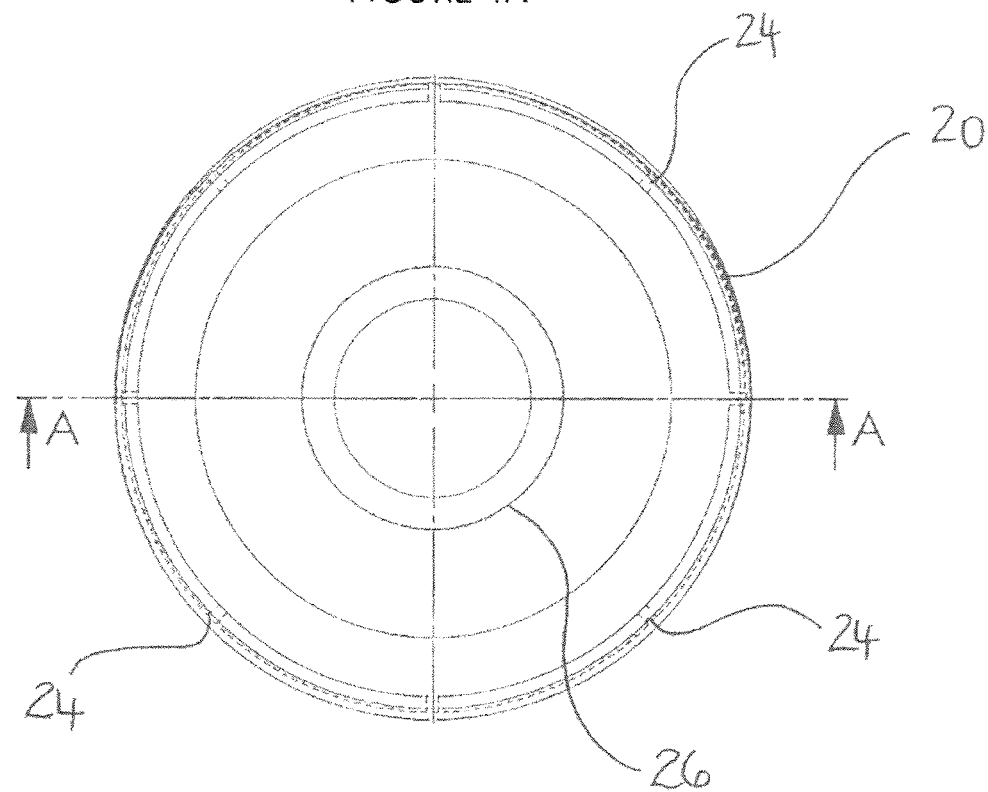
FIG. 4 is an end view of the end cap of FIG. 3, illustrating an annular gallery.

The end cap 20 is shown in a top view in FIG. 4. The end cap 20 has a circular profile having two distinct diameters. The first and widest section of the end cap 20 is configured to fit into the first end 12 and the second end 13 of the housing 11 to form the carrier 10. This section of the end cap is bounded by the screw thread 29 for engagement with the housing 11.

In FIG. 4 a plurality of outlets 24 are illustrated, equidistantly spaced around the circumference of the cap 20. In this embodiment, each of the eight outlets 24 are configured to be in fluid connection with eight fluid channels 16 within the housing 11 and thereafter fluidly connect with eight outlets 24' within the second end cap 20'. The number of fluid channels 16 and corresponding outlets 24, 24' can be adjusted to further control the amount, and more importantly the rate at which fluid can be transferred between the first 21 and the second 22 galleries when the differential gear 1 is in use. The more fluid channels 16 the more fluid can travel between the galleries; however, the rate at which the fluid traverses the channels 16 is determinative of the stiffening effect or impedance on the differential gear 1.

Figure 11:
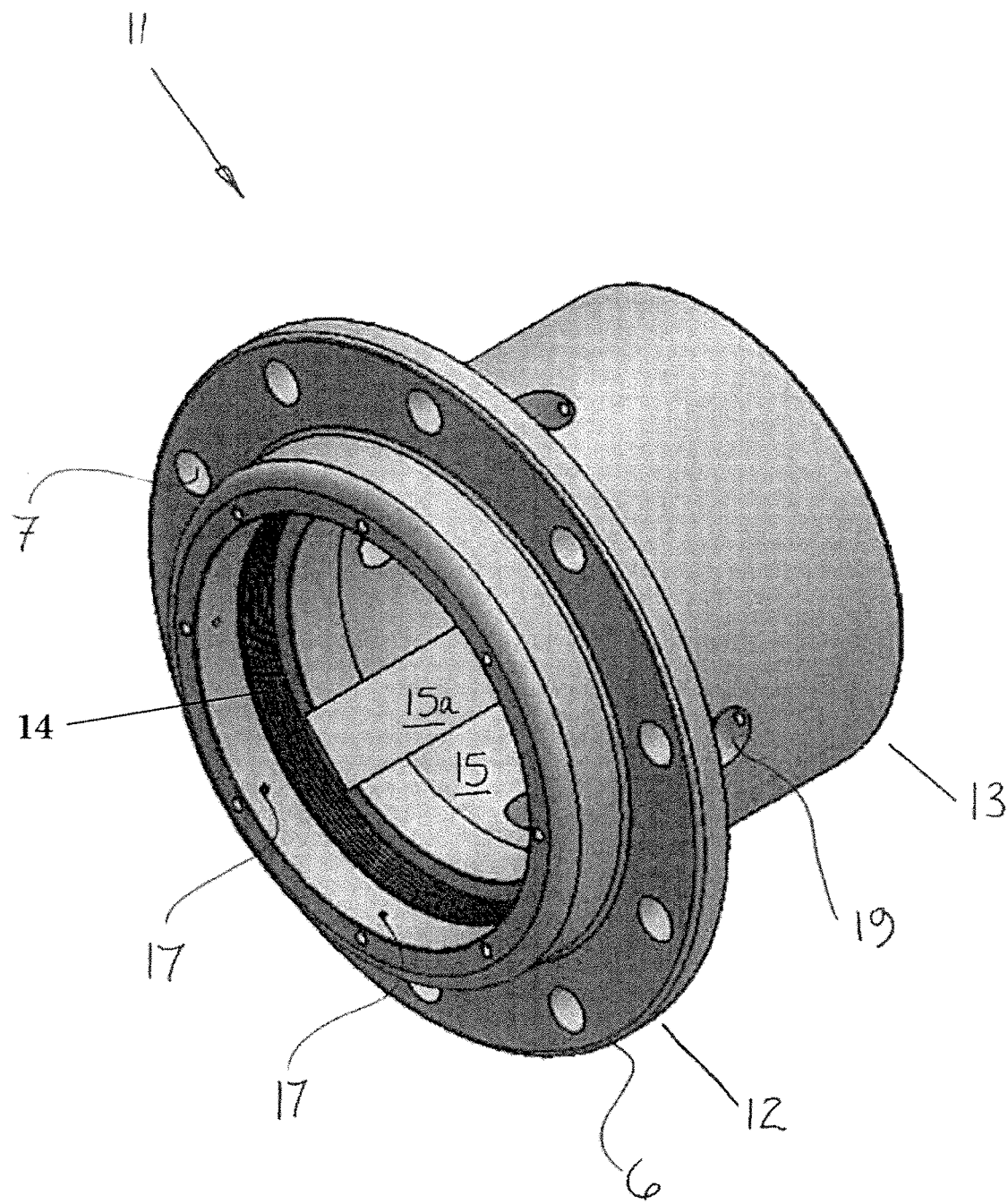
FIG. 11 is a perspective view of the housing of FIG. 1, illustrating an internal recess for keying with guide ways of the actuator.

FIG. 11 illustrates the housing 11 and the opening therein to receive the end cap 20. The housing 11 provides the mating thread 14 to engage the screw thread 29 of the end cap 20, thus joining the end cap 20 to the housing 11.

On a portion of the internal wall 11a of the housing 11, a series of conduit inlets 11 are disposed. There are eight inlets 17 equidistantly spaced circumferentially around the inside of the housing 11. The eight inlets 17 are configure to align with the eight conduit outlets 24 within the end cap 20, thus providing fluid communication from the first gallery 21 into fluid channel 16 within the housing 11. A similar arrangement of inlets 17' is disposed at the second end 13 of the housing which is configured to align with the conduit outlets 24' within the end cap 20'. This arrangement completes the sealed fluid system that allows transfer of fluid from the first gallery 21 to the second gallery 22 in response to pressure variations in either of the two galleries, in response to the linear, reciprocating motion of the actuator 60.

A large circular recess is provided on the inside face of the cap 20, this recess is the contact surface 25 on which the side bevel gear 40 will seat. The centre of the recess 25 is further configured with a secondary recess 25a of smaller diameter, to conform to the axle mounting collar 48 of the side gear 40. These recesses can be clearly seen in FIG. 4A, which is a sectional view of the end cap 20, taken along line A-A of FIG. 4. The central aperture 27 through which the axle protrudes is concentrically aligned with the first 25 and the second 25a a bevel gear contact surface.

FIG. 4A illustrates the depth to which the first gallery 21 extends into the end cap 20. In this embodiment the first 21 and second 22 galleries have a depth of about 10 mm. This inner diameter of each gallery is about 86 mm and the outer diameter of each gallery is about 98 mm. These dimensions give each gallery a width of about 6 mm. Therefore, each gallery 21, 22 has a capacity of about 0.17 litres.

The capacity of the fluid gallery 21, the travel of the actuator 60 and the stiffness of the differential gear 1 are all interconnected and as such can be varied in controlled ratios with one another. In FIG. 4A the first gallery 21 extends into the depth of the end cap 20 by three quarters of the depth of the end cap 20. This gallery 21 is annular in shape and is configured as a bore into the body of the cap 20, coaxially aligned with the central aperture 27.

Approximately half the side portion 23 of the cap 20 is covered by the screw thread 29 for attaching the cap 20 to the housing 11. On the side portion 23 of the cap 20, in close proximity to the screw thread 29, the outlets 24 are disposed. The section of FIG. 4A illustrates two opposing outlets 24, symmetrically positioned around the cap 20. The outlets 24 extend from the side portion 23 of the cap 20 into the first gallery 21, each outlet 24 being bounded by the pairs of annular projections 8a,8b and 8a',8b to seat and retain the end cap seals 9, 9' (illustrated in FIG. 14A). There are no valves illustrated in FIG. 4A; however, it is contemplated that a valve 4, 4' or series of valves can be disposed in fluid connection with the outlets 24 to provide a further means of controlling the flow of fluid into and out of the gallery 21 (see FIGS. 13A and 14A where optional locations of valve 4 and 4' are illustrated). It is contemplated that a series of valves can be electronically controlled and thereby allow for further adjustments of the differential gear 1 either on installation of the gears or during use. For example, when the valve 4 is partially closed, the pressure required to force the fluid past the valve and into the channel 16 will be increased, and the differential gear 1 further stiffened.

In an off-roading situation, it may be desirable to lock the differential gear 1 completely. Accordingly, the valve 4 or valves can be electronically closed, ceasing flow of fluid between the two galleries 21, 22 and effectively locking the left and the right axle together to form a closed or locked differential gear 1.

A pinion assembly 30 is disposed within the carrier 10. The pinion assembly 30 comprises a mount, illustrated in FIG. 1 as a pinion block 36, a long cross-shaft 37 and two short cross-shafts 38. The long cross-shaft 37 and short cross-shafts 38 are centrally mounted in the pinion block 36 to form a cross shaped assembly upon which four pinion gears 31 are equidistantly mounted.

The cross-shaft 37 and cross-shafts 38 are fixed to the pinion block 36 by a plurality of securing bolts 39 that pass through both the pinion block 36 and one of each of the cross-shafts 37, 38.

The pinion gears 31 are slidingly mounted onto the cross-shafts 37, 38 with a front face 33 of each pinion gear 31 facing toward the pinion block 36. The rear face 34 of each pinion gear 31 is disposed to face the internal wall 11a of housing 11.

Figure 17:
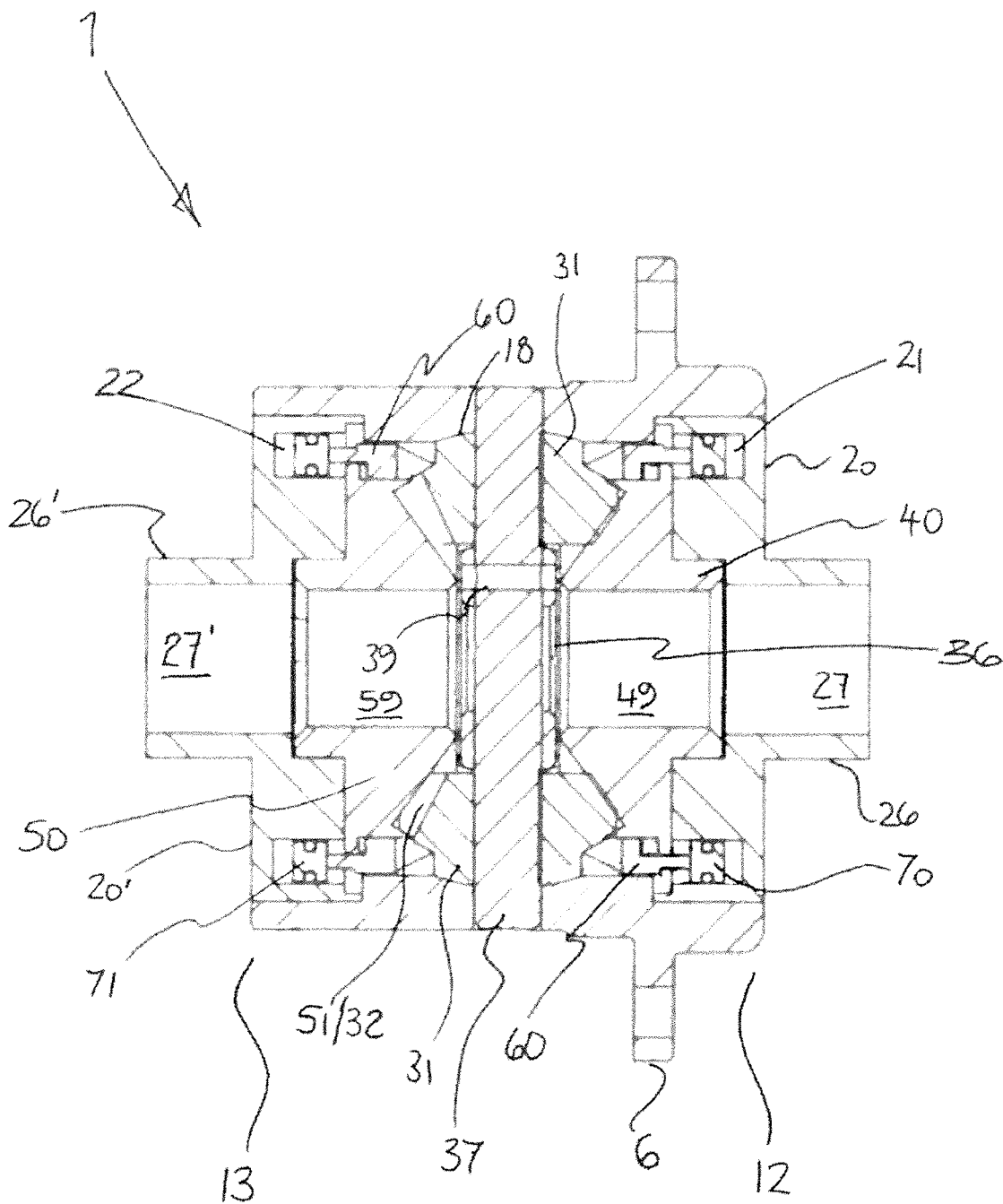
FIG. 17 is a sectional view along line G-G of FIG. 15, illustrating the fully assembled differential gear of FIG. 1, illustrating a pinion block bolted to a pinion cross-shaft.

As the pinion gear 31 is free to slide along the cross-shaft 37, 38 a restraint to their movement is provided by means of a shaped recess 18 in the wall 11a of the housing 11 (illustrated in section view in FIG. 17). The pinion gear 31 is thus rotatably trapped upon the cross shaft 37, 38 and when assembled, constrained linearly by both the pinion block 36 and the housing 11. There are no split pins securing the pinion gears 31 to the cross-shafts 37, 38 within the differential gear 1.

The differential gear 1 illustrated in FIGS. 1 to 17 has four pinion gears 31 which means that it is capable of taking high loads, having four pinion gears 31 to distribute load between the side gears 40, 50. However, for alternative embodiments the differential gear 1 can be assembled to have only one pinion gear 31, or two pinion gears 31 or three pinion gears 31.

In the assembled differential gear 1 the pinion assembly 30 is located within the actuator 60, disposed between the first 40 and second 50 bevel gears, all of which is then packaged within the carrier 10.

Figure 5:
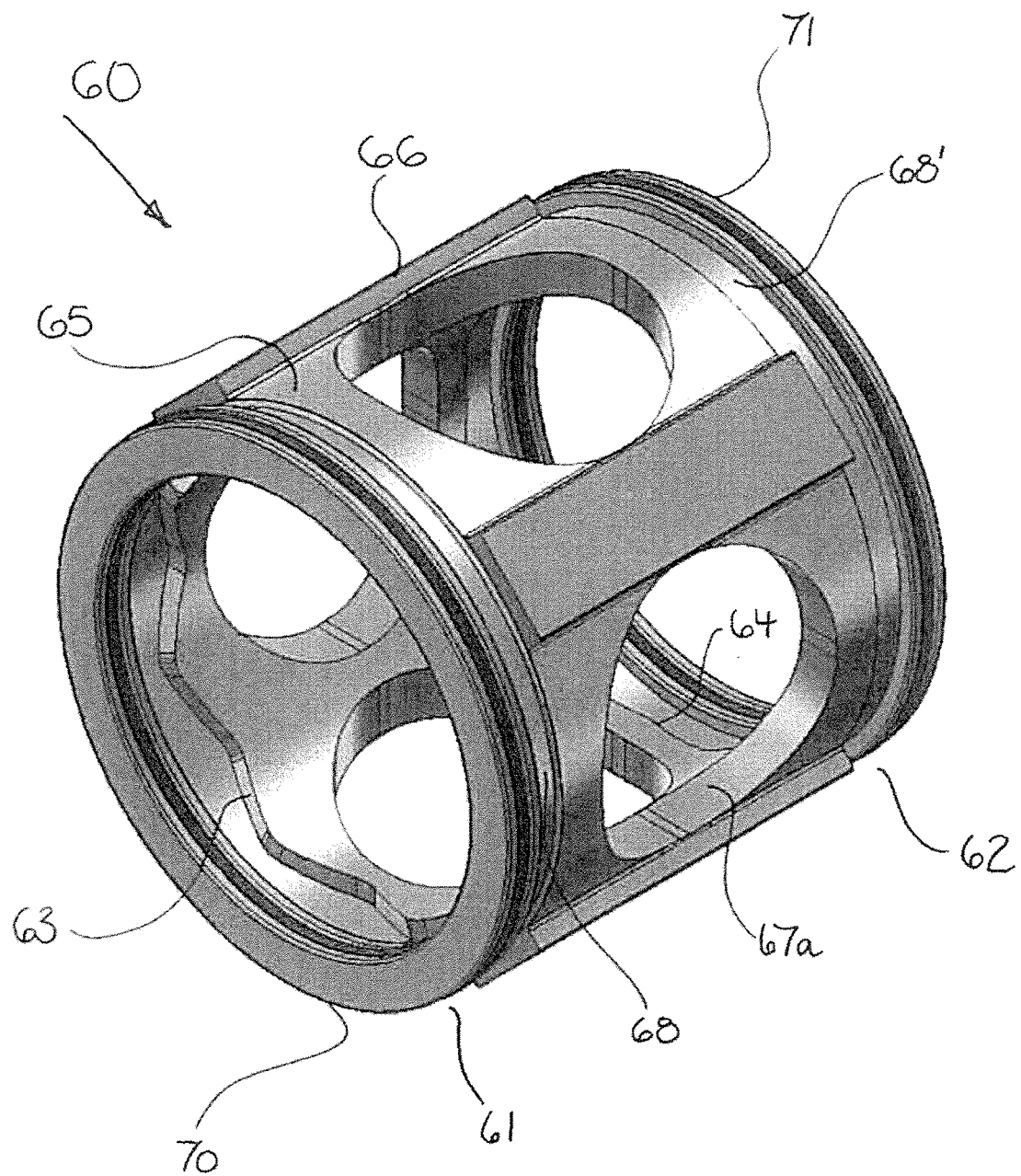
FIG. 5 is a perspective view of an actuator that surrounds the internal gears of the differential gear of FIG. 1.

The actuator 60 is an essentially cylindrical component, having a first end 61 and a second end 62. A side wall 65 of the actuator 60 provides a number of external guide ways 66 to act as bearings to guide the actuator 60 in its linear, reciprocating motion back and forth across the carrier 10. The guide ways 66, illustrated in FIG. 5, are rectangular protrusions that insert into cooperating linear recesses 15a within the internal wall 11a of the housing 11. These cooperating features ensure that the actuator 60 is constrained to move in a linear motion, and not subject to any rotation or twisting within the carrier 10.

Aside from the guide ways 66, the actuator 60 has at least one pinion aperture 67 in the side wall 65. In FIG. 5, the actuator is shown to have four apertures 67 to correspond with the four pinion gears 31. The apertures 67 are circular; however, it is contemplated that they can be configured as ovoid apertures without hampering the operation of the differential gear 1. The diameter of each aperture 67 is greater than that of the rear face 34 of the pinion gear 31 to allow the actuator 60 to translate back and forth within the carrier 10, without impacting or contacting the pinion gears 31 during its stroke.

Inner walls 67a of the aperture 67 are cut to be perpendicular to a side wall 65 of the actuator 60. In some embodiments of the invention the inner walls 67a can be tapered to increase clearance around the pinion gears 31. In these alternative embodiments the inner diameter of the aperture 67 can be larger than that of the outer diameter of the aperture 67.

At the first end 61 there is disposed an L-shaped lip 68. An upright (vertical) portion 68a of the L-shaped lip abuts the piston 70 thereby providing a contact surface $Z_1$ between the actuator 60 and the piston 70 for transferring force or pressure between the two components. A base (horizontal) portion 68b, of the L-shaped lip 68, forms a shoulder on the inside of the actuator 60 which is configured to provide a first reaction surface 63. The reaction surface 63 comprises a series of wave-like forms or cam projections that circumvent the internal shoulder of the actuator 60. The height h of one of these projections on the reaction surface 63 is equal to the length of stroke s of the actuator 60.

Figure 9:
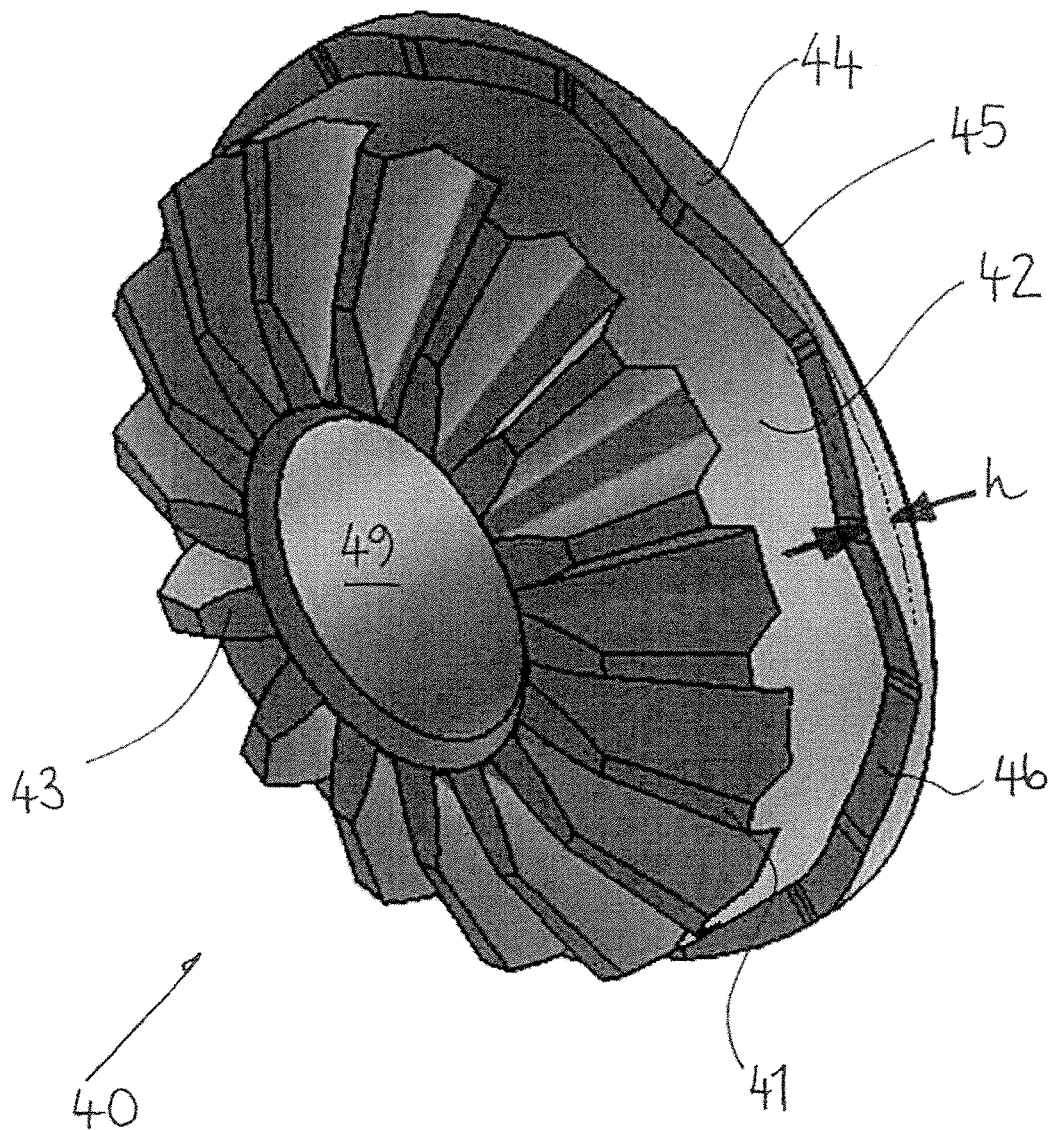
FIG. 9 is a perspective view of a side bevel gear, illustrating a series of externally cammed surfaces around the circumference of the gear.

As the second end 62 of the actuator is an identical L-shaped lip 68'. An upright portion 68a' of the L-shaped lip 68' abuts the second piston 71 thereby providing a contact surface $Z_2$ between the actuator 60 and the piston 71 for transferring force or pressure between the two components. A base portion 68b' of the L-shaped lip 68' forms a shoulder on the inside of the actuator 60 which is configured to provide a second reaction surface 64. The second reaction surface 64 comprises a series of wave-like forms or cam projections that circumvent the internal shoulder of the actuator 60. The height h of one of these projections on the reaction surface 64, is equal to the length of stroke s of the actuator 60. The height h can be between 2 mm and 10 mm. The embodiments illustrated in FIG. 6A and FIG. 9 is approximately h=3 mm. However, the stroke of the actuator 60 can be adjusted for the size of differential gear (torque to be distributed) and the packaging space available within the vehicle differential housing.

Disposed at a first end 61 of the actuator 60 is a piston 70. Disposed at the second end 62 of the actuator 60 is a second piston 71. When the actuator 60 moves linearly within the carrier 10, the pressure is increased on the first piston 70 by applying a force on the first contact zone Z1 and decreased on the second piston 71 by reducing the force on the second contact zone Z2. As the actuator 60 travels in an opposing direction the pressure is decreased on the first piston 70 and increased on the second piston 71.

The contact zone Z1 is annular in cross-section and has a thickness of about 6 mm. The cross-sectional area of contact zone Z1 can be increased in thickness to increase the reaction forces on the contact zone Z1. Alternatively, the diameter of the annular cross-section can be increased if a larger contact zone Z1 is required. Similar adjustments will also be required to contact zone Z2 to maintain balance of the differential gear 1.

The first piston 70 is identical to the second piston 71. The piston 70 comprises an annular or toroidal form. The piston 70 has an H-shaped cross section, horizontally oriented in relation to the L-shaped lip 68 of the actuator 60. Around the external circumference of the piston 70 is an outer seal, illustrated in FIG. 6A as an O-ring 77. The O-ring 77 externally circumvents the piston 70 and seats within an outer portion of the H-shaped cross-section thereof. A second seal, illustrated in FIG. 6A (and enlarged for clarity in FIG. 7) as an O-ring 78, internally circumvents the piston 70 and is seated within an inner portion of the H-shaped cross-section. The two O-rings 77, 78 in combination with the piston 70 seal the first fluid gallery 21 within the end cap 20.

The second piston 71 is also H-shaped, having an outer seal, illustrated in FIG. 6A as O-ring 77' and an inner seal, illustrated as O-ring 78'. The two O-rings 77', 78' in combination with the piston 71 seal the second fluid gallery 22 within the end cap 20'.

The side bevel gears 40, 50 are identical. The first bevel gear 40 comprises a front face 43 that faces toward the pinion assembly 30 and a rear face 45 that faces towards the end caps 20, 20' when assembled within the differential gear 1.

The bevel gear 40 has an outer surface 42 having a relatively constant diameter and a peripheral skirt 44 disposed circumferentially around the outer surface 42 at the rear face 45 of the bevel gear 40, illustrated in FIG. 9. The peripheral skirt 44 is configured to provide a first operating surface 46. The first operating surface 46 comprises a series of wave-like forms or cam projections that circumvent the peripheral skirt 44 of the bevel gear 40. The height h of one of these projections on the operating surface 46 equals the stroke s of the actuator 60. The height h of one projection on the first operating surface 46 is illustrated in the sectional view of FIG. 10A. The height h is about 3 mm.

Figure 10A:
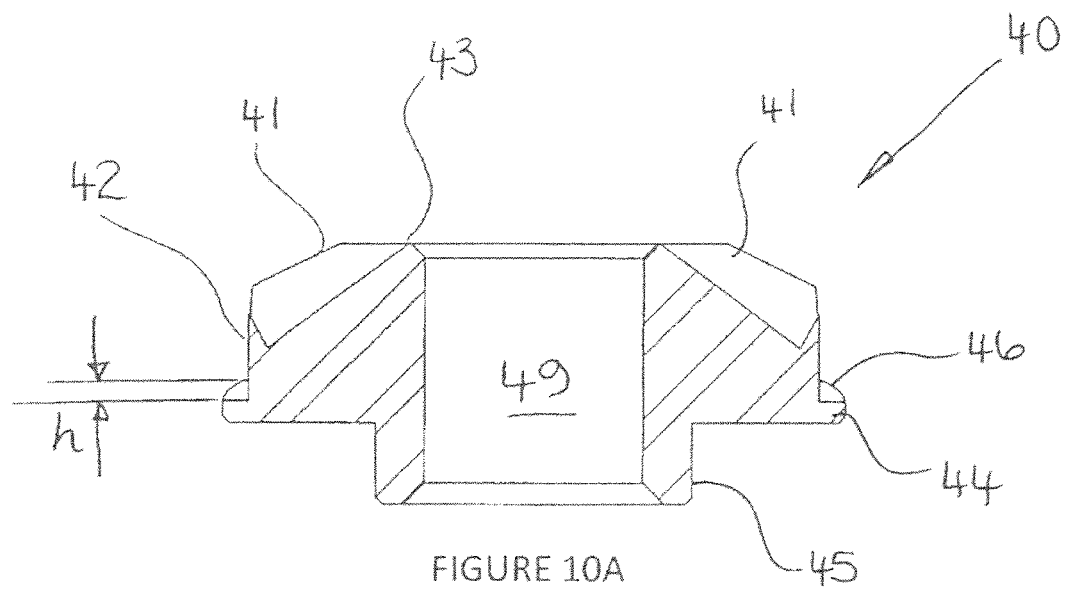
FIG. 10A is a sectional view along line C-C of FIG. 10, illustrating the external cammed surfaces circumferentially disposed about the hollow bevel gear.
Figure 10:
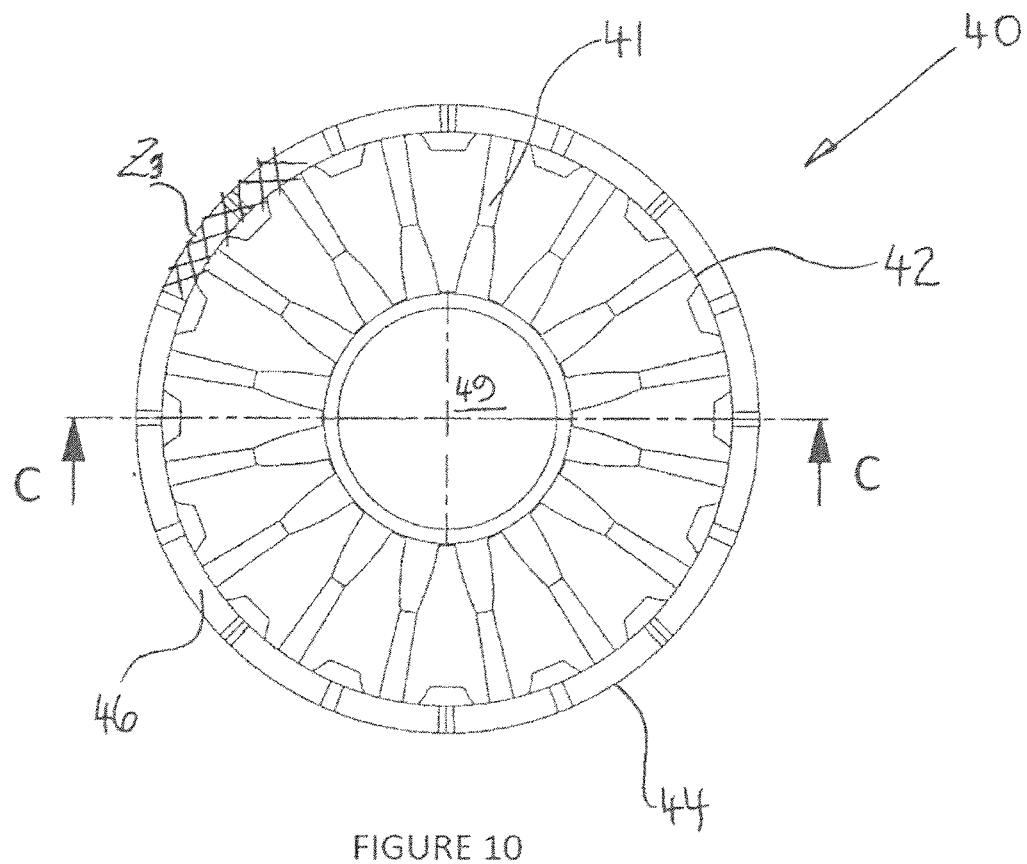
FIG. 10 is an end view of the side bevel gear of FIG. 9.

The peripheral skirt 44 is of a greater diameter than the outer surface 42, illustrated in FIGS. 10 and 10A. This allows the bevel gear 40 to be slid partially inside of the actuator 60 thus bringing the first reaction surface 43 into cooperating engagement with the first operating surface 46 of the bevel gear 40. While the first reaction surface 43 and first operating surface 46 are engaged with one another at a first end 61 of the actuator 60, the bevel gear 40 is meshingly engaged with the pinion assembly 30 and the second bevel gear 50 and the bevel gear 40 is free to rotate internally of the actuator 60.

The area where the first reaction surface 63 and first operating surface 46 engage with one another is the contact zone Z3. Contact zone Z3 has been partially hatched on FIG. 10 for clarity. The area where the second reaction surface 64 and second operating surface 56 engage with one another is the contact zone Z4; illustrated in FIG. 16.

The bevel gear 50 has an outer surface 52 having a relatively constant diameter and a peripheral skirt 54 disposed circumferentially around the outer surface 52 at the rear face 45 of the bevel gear 40. The peripheral skirt 54 is configured to provide a second operating surface 56. The second operating surface 56 comprises a series of wave-like forms or cam projections that circumvent the peripheral skirt 54 of the bevel gear 50. The height h of one of these projections on the operating surface 56 is equal to the length of stroke s of the actuator 60.

The peripheral skirt 54 is of a greater diameter than the outer surface 52. This allows the bevel gear 50 to be slid inside of the actuator 60 thus bringing the first reaction surface 53 into cooperating engagement with the first operating surface 56 of the bevel gear 50. While the second reaction surface 64 and second operating surface 56 are engaged with one another at a second end 62 of the actuator 60, the bevel gear 50 is meshingly engaged with the pinion assembly 30 and the first bevel gear 40 and the bevel gear 50 is free to rotate internally of the actuator 60.

The front faces 43, 53 of the bevel gears 40, 50 are configured with a plurality of teeth 41, 51. The teeth 41, 51 are precisely cut to a high degree of accuracy to frictionlessly mesh with the pinion gears 31 disposed therebetween. The front face 43, 53 is flat to minimise the opportunity of the bevel gears 40, 50 catching or snagging with components of the pinion assembly 30 when rotating at speed ie when the differential gear 1 is in use.

A large central aperture 49, 59 is provided within each of the bevel gears 40, 50 respectively, for inserting the left and the right axles of the vehicle. The axles are generally splined or keyed to provide a non-rotating contact between each axle and the respective bevel gear 40, 50. Furthermore, bolts or other securing fittings can be attached between the axles and respective axle mounting collars 48, 49 on the rear faces of each bevel gear 40, 50.

The bevel gears 40, 50 each have 16 teeth 41, 51 and 8 cam surfaces on their respective first 46 and second 56 operating surfaces. Therefore, one full rotation of either axle will produce 16 strokes of the actuator 60 (8 strokes in both reciprocating directions). The pinion gear/s 31 by comparison has only 9 teeth 32. Accordingly, the bevel side gears 40, 50 are offset from one another by one tooth of the pinion gear 31.

Figure 12:
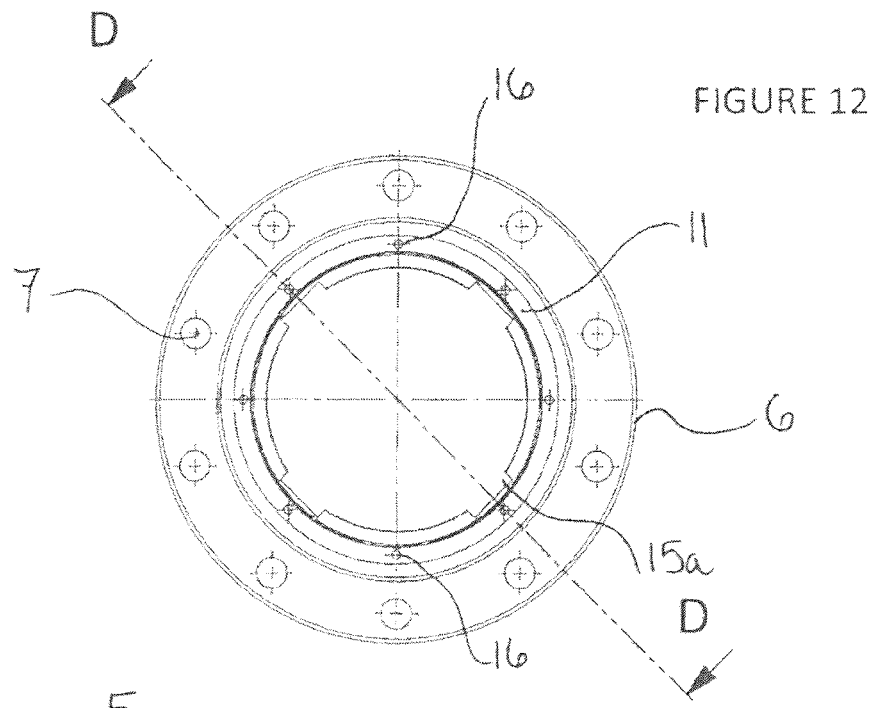
FIG. 12 is an end view of the housing, illustrating a plurality of fluid conduits circumferentially spaced around a wall of the housing.

Turning now to FIGS. 12 through 14A, the components of the differential gear 1 are brought together in stages. FIG. 12 is an end view of the housing 11 and FIG. 12A is a cross sectional view along the line D-D of FIG. 12.

In FIG. 12 eight, equidistantly spaced fluid channels 16 are marked through the internal wall 11a of the housing 11. These channels 16 emerge from the wall 11a at conduit inlets 17, which are illustrated in FIG. 12A. Two of such inlets 17 are bisected by the cross section of FIG. 12A. Fluid from either of the first 21 or the second 22 galleries is free to travel along the channels 16 of the housing 11 and emerges at inlets 17, 17' where the fluid is communicated into the end caps 20, 20' via the outlets 24, 24' therein.

The conduit inlets 17, 17' are disposed outwardly of the mating screw threads 14, 14', that is to say the inlets 17, 17' are in closer proximity to the first end 12 and the second end 13, respectively, of the carrier 10 than the screw threads 14, 14'.

Figure 12A:
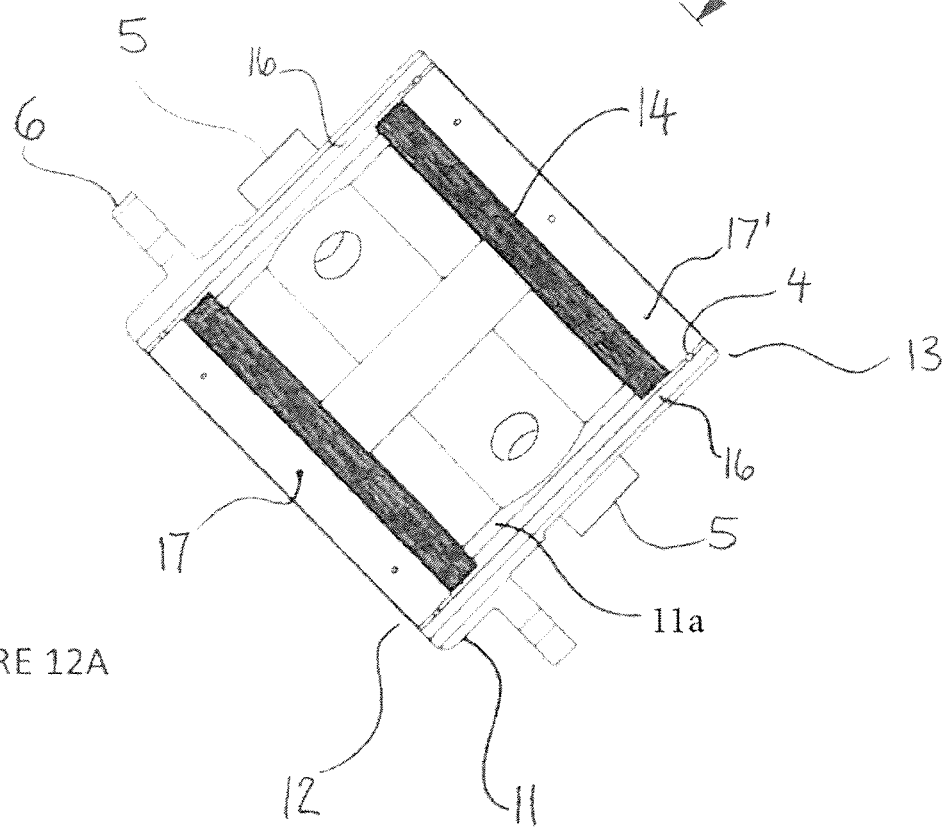
FIG. 12A is a sectional view along line D-D of FIG. 12, illustrating internal features of the housing, including a pair of threaded end portions for engaging a pair of end caps.

In the sectional view of FIG. 12A the concave recess 18 for partially housing and thereby retaining the pinion gear 31 is clearly shown. The recess is approximately central to the wall 11a of the housing and circumvents substantially the entire housing 11. It is contemplated that individual recesses 18 can be formed in the internal wall 11a of the housing 11 to accommodate each of the pinion gears 31 individually.

In some embodiments of the differential gear 1, the working fluid within galleries 21, 22 is an ATF. In some embodiment it is contemplated that a magnetorheological fluid (MR fluid) can be used. An MR fluid is a form of smart fluid where small ferrous particles are added to a base fluid, such as oil. When the MR fluid is subjected to an electromagnetic field, the ferrous particles within the oil base are re-oriented and aligned in accordance with the direction of the lines of magnetic flux. In this manner the viscosity of the fluid is altered (increased). MR fluids are differentiated from ferro-fluids as the size of ferrous particulates, in MR fluids, are typically larger than those of a ferro-fluid to provide a greater effect on the viscosity of the fluid.

As an alternative to using valves 4 and 4' as illustrated in FIGS. 13A and 14A, FIGS. 12A and 12B illustrate a magnetic field generator 5. The magnetic field generator 5 can be an electromagnet, solenoid, coil or other form of generator connected to a power source (not illustrated) by virtue of electrical connectors 5a, 5b to enable the magnetic field to be selectively turned on and off. In combination with an MR fluid as the working fluid, the magnetic field generator 5 can be used to alter the stiffness of the working fluid and thereby alter the stiffness of the differential gear 1. In practice, an electric current is activated by the driver of the vehicle to generate magnetic current across the conduits 16 within the differential gear 1. As the ferrous particles within the MR fluid align the viscosity of the working fluid increases thereby increasing the stiffness of the differential gear 1. When the increased stiffness of the differential gear 1 is no longer required, the power supply to the magnetic field generator 5 is stopped and the MR fluid reverts to a lesser, base line, viscosity.

The location of the magnetic field generator 5 as illustrated in FIG. 12A will determine the magnetic lines of flux across the conduits 16. Accordingly, the direction of the magnetic flux and the location of the magnetic flux can be altered by repositioning the magnetic field generator 5 along the carrier 10. It is further contemplated that the magnetic field generator 5 can be located in the end caps 20 or in an alternative location in close proximity to the fluid galleries 21, 22 to increase the viscosity of the MR working fluid within the galleries 21 and 22 whilst causing a lesser effect on the working fluid within the conduits 16.

Figure 12B:
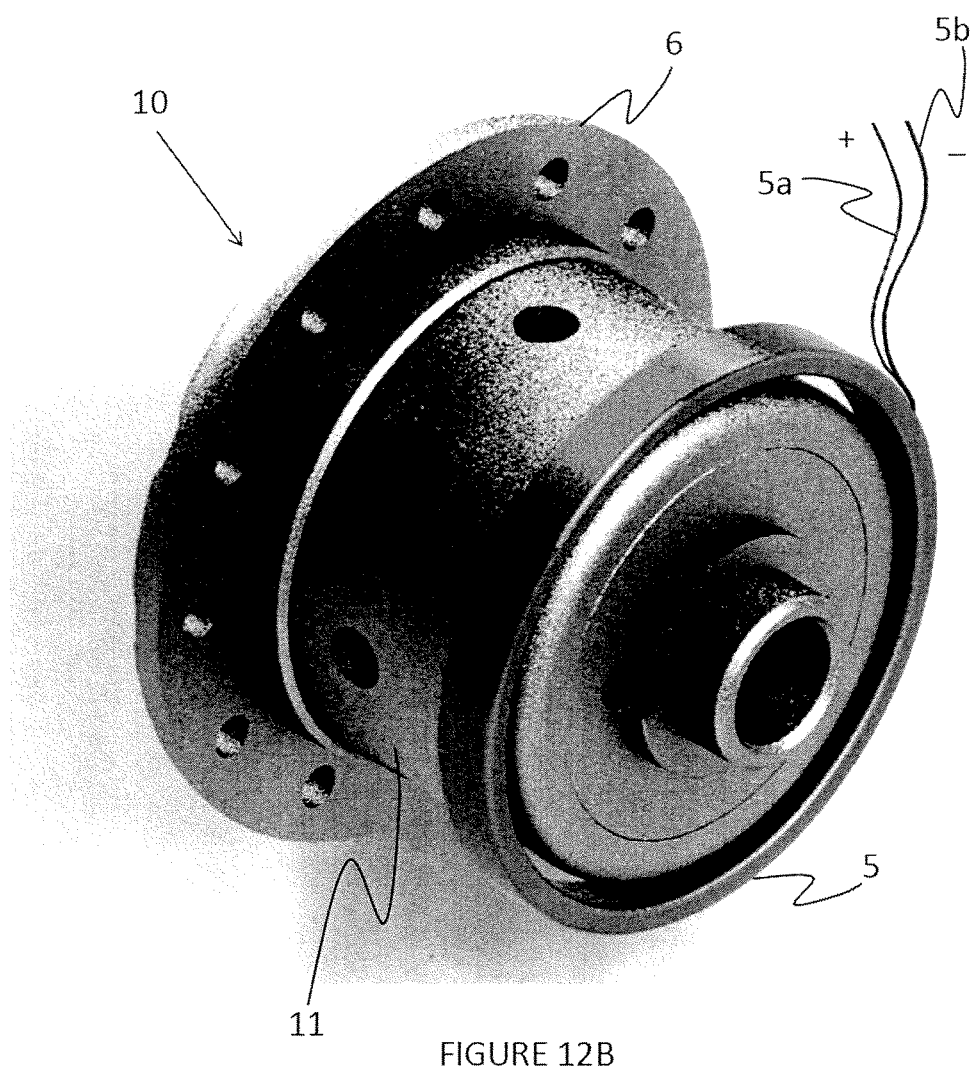
FIG. 12B is a perspective view of a prototype housing illustrating a magnetic field generating coil encircling an end region of the housing.

FIG. 12B illustrates an alternative location for the magnetic field generator 5 at the end of the housing 11 in proximity to the fluid galleries 21 and 22. FIG. 12B further illustrates a positive wire 5a and negative wire 5b as a possible alternative for connecting the magnetic field generator 5 to a power source (not illustrated). In this embodiment the magnetic field generator 5 is a wire coil configured as an annulus that entirely encircles the housing 11 of the carrier 10. In alternative embodiments the wire coil annulus is not continuous and is instead configured to generate a magnetic field in specific, discrete locations.

The magnetic field generator 5, as a wire coil amongst other embodiments, is not required to be in physical contact with the differential gear 1 or the housing 11. As such, the magnetic field generator 5 can be mounted to the vehicle on an adjacent component eg. a differential casing, a sub-frame or a chassis, such that it does not rotate with the differential gear 1.

Figure 13A:
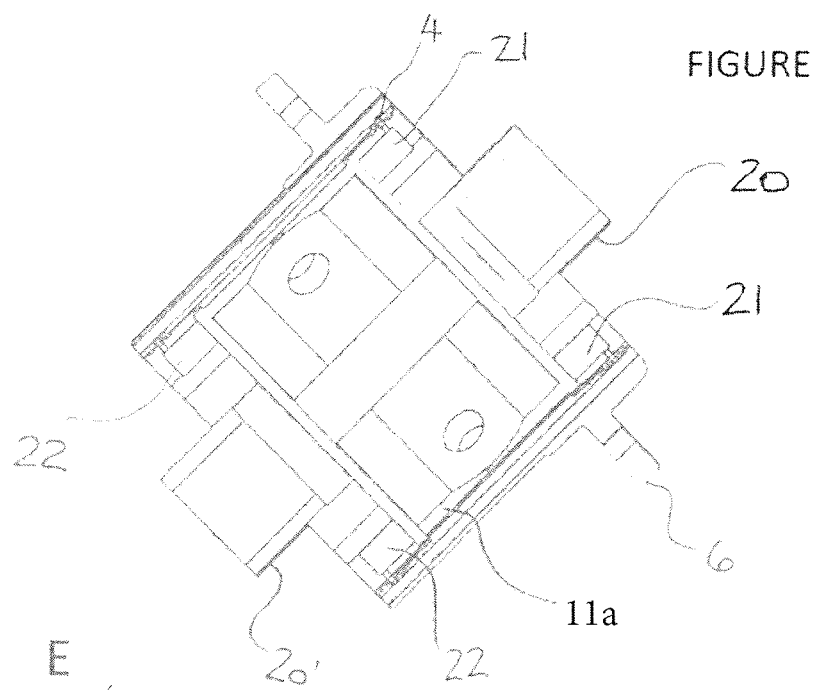
FIG. 13A is a sectional view along line E-E of FIG. 13, illustrating the internal component stack-up of the end caps within the housing.
Figure 13:
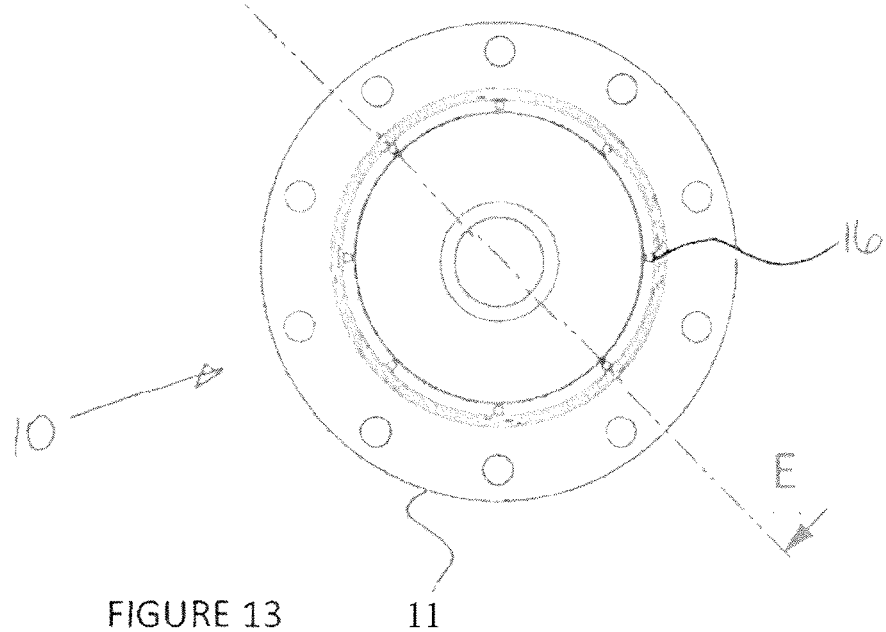
FIG. 13 is an end view the housing of FIG. 11 assembled with the two end caps, according to those of FIG. 3.
Figure 14:
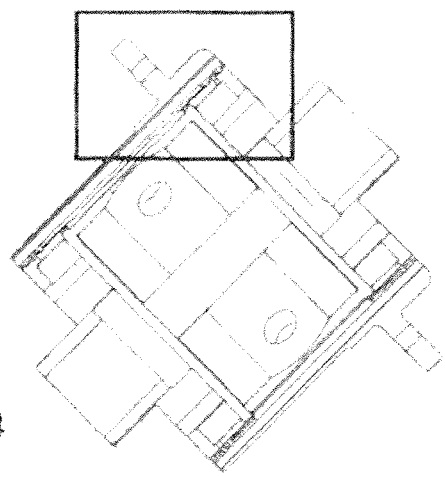
FIG. 14 is a copy of FIG. 12A marked with a viewing pane.

In FIG. 13 an end view of the housing 11 is illustrated having both end caps 20, 20' threadingly connected thereto and the actuator 60 housed within. FIG. 13A is a cross sectional view of FIG. 13, taken along line E-E. FIG. 14 is a duplicate of FIG. 13A, illustrating a local area of the figure, which is enlarged for detail in FIG. 14A. When the end cap 20 is threadingly engaged with the housing 11, the outlets 24 of the end cap 20 and the inlets 17 in the housing are aligned and fluid can flow from fluid gallery 21 into conduit 16. At the same time the end cap 20' is threadingly engaged with the second end 13 of the housing 11, such that the outlets 24' of the end cap 20' and the inlets 17' of the housing become aligned and fluid can flow from second gallery 22 into conduit 16. In this manner the assembled differential gear 1 provides a sealed hydraulic system operating with the periphery of the differential gear 1. The sealed hydraulic system is interconnected with the internal workings of the differential gear 1 such that the stiffness of the differential gear 1 is continuously variable in proportional response to the rate at which fluid is driven between the first 21 and second 22 fluid galleries.

Figure 15:
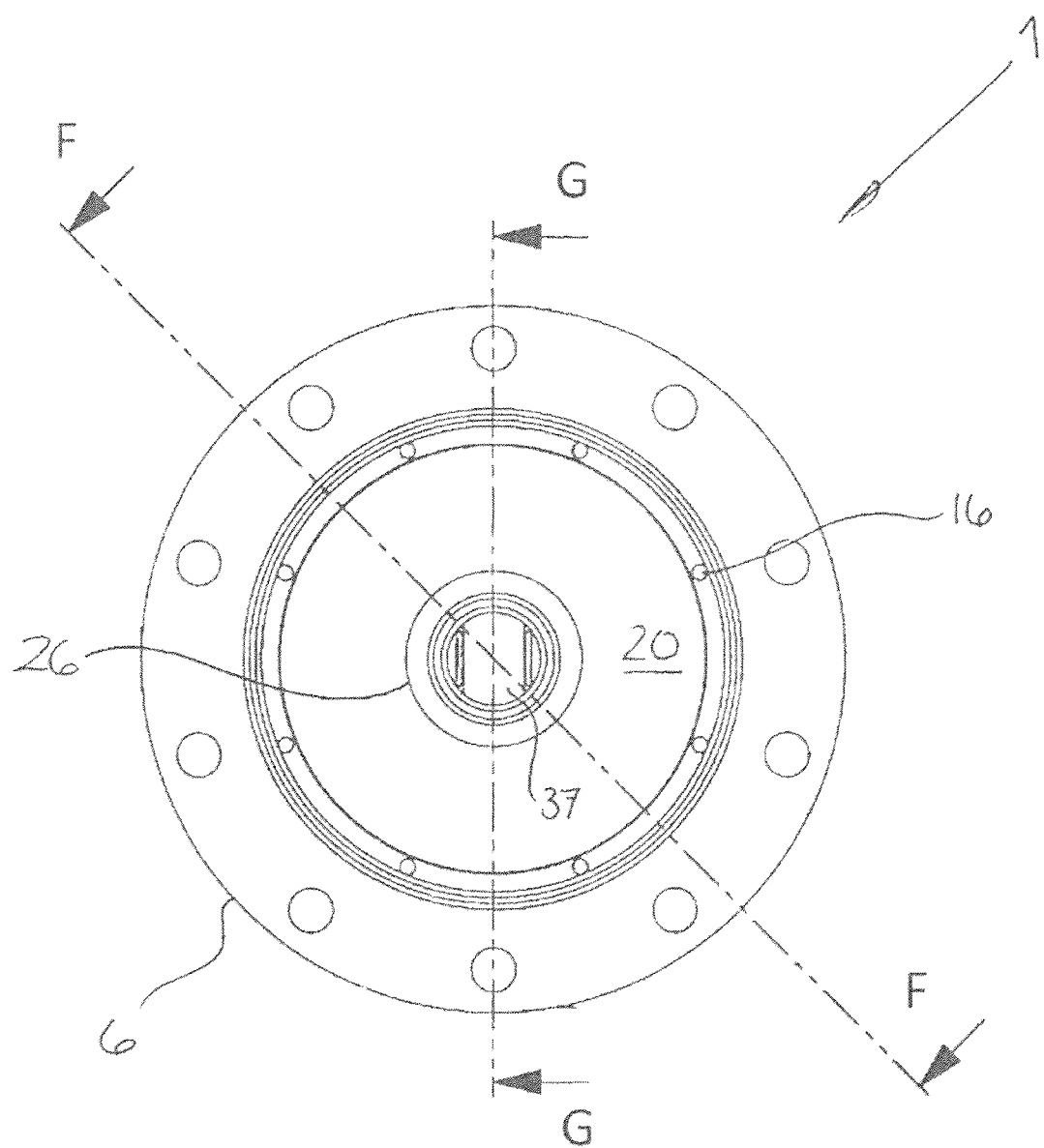
FIG. 15 is an end view of the fully assembled differential gear of FIG. 1.
Figure 16:
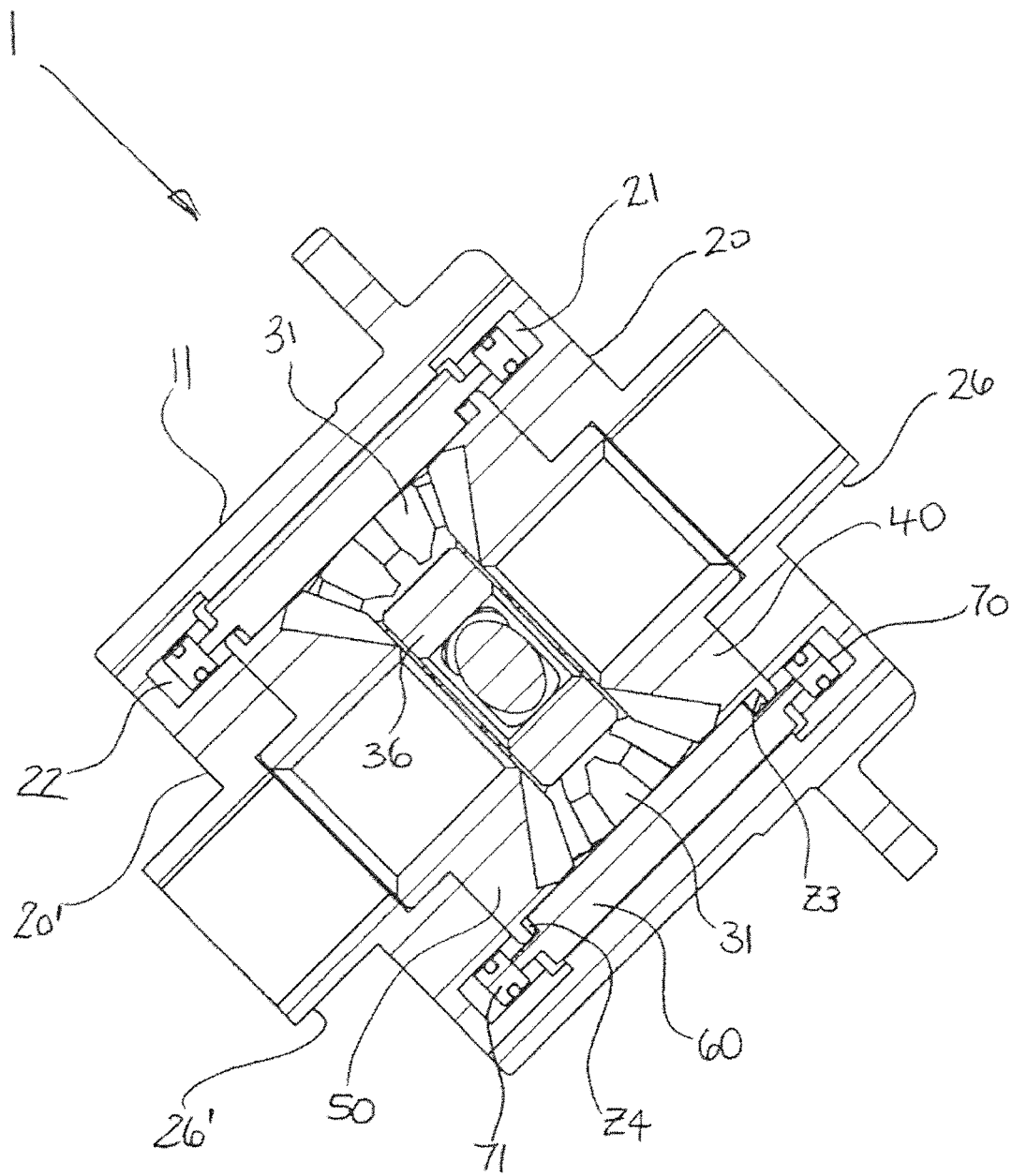
FIG. 16 is a sectional view along line F-F of FIG. 15, illustrating the actuator disposed within the housing and having a piston at either end thereof.

FIGS. 15 to 18 illustrate the fully assembled differential gear 1, in FIG. 15 from an end view and in FIGS. 16 and 17 in two sectional views, FIG. 16 taken symmetrically through the pinion block 36 and FIG. 17 taken at 45 degrees to the section of FIG. 16.

When the differential gear 1 is fully assembled but not connected to a pair of axles the long cross shaft 37 is visible through the journal aperture 27 of the end cap 20. In its assembled state, differential gear 1 provides mounting journals 26, 26' at both ends thereof and a mounting flange 6 for receiving a crown wheel (or ring gear) with which to connect the differential gear 1 with the drive train of the vehicle. All of the internal gears and moving components are housed within the differential gear 1 and internally lubricated therein. The lubricating fluids of the differential gear 1 are entirely separated from the fluid within the hydraulic system and the two do not mix or come into any contact situation, while the differential gear 1 is in use in the vehicle.

FIG. 16 illustrates the close mating relationship between each of the internal components of the differential gear 1. The teeth 41, 51 of the bevel gears 40, 50 and teeth 32 of the pinion gears 31 are meshingly engaged. The tolerances required to produce the gears 40, 50, 31, actuator 60, carrier 10 and pinion assembly 30 to ensure accurate interconnection of these components is very high. As such the components can be cast and thereafter machine finished to achieve the necessary dimensional accuracy. In some embodiments the gears will be heat treated and surface treated after manufacture to increase or enhance their material properties e.g. hardness, toughness, surface finish, ultimate tensile strength, fatigue strength etc.

Upon assembly, the rear faces 45, 55 of the bevel gears 40, 50 are abutted to the contact surfaces 25, 25*a* of the end caps 20, 20' and are slid into place from either side of the actuator 60 thereby trapping the pinion assembly 30 therebetween. The first gallery 21 is filled with the working fluid of the hydraulic system and the pistons 70, 71 are positioned within the fluid galleries 21, 22 with the outer 77, 77' and inner 78, 78' O-rings circumventing the pistons 70, 71 ready to be compressed into position within the first 21 and second 22 galleries thereby sealing the hydraulic system within the carrier 10.

As the bevel gears 40, 50 are slid into the actuator 60, the first operating surface 46 of bevel gear 40 and the first reaction surface 63 of the actuator 60 are aligned and the cam surfaces thereupon are brought into engagement with one another. Similarly, the second operating surface 56 of bevel gear 50 and the second reaction surface 64 of the actuator 60 are aligned and the cam surfaces thereupon are brought into engagement with one another. The actuator 60 is neutrally positioned between the first end 12 and the second end 13 of the carrier 10 where the fluid levels in the first gallery 21 and the second gallery 22 are equal in volume, as illustrated in FIG. 16.

The sectional view of FIG. 17 is taken along line G-G of FIG. 15 and bisects an opposing pair of pinion gears 31 symmetrically. The pinion gears 31 protrude through the side wall 65 of the actuator 60 and into the recess 18 within the internal wall 11*a* of housing 11. The recess 18 prevents the pinion gears 31 from axially moving along the long cross-shaft 37 and out of engagement with the bevel gears 40, 50.

The differential gear 1 described herein is configured to receive a crown wheel on the mounting flange 6 of the carrier 10. The crown wheel and differential gear 1 assembly is engagingly connected to a prop shaft of a vehicle to drive the crown wheel and thereby drive the differential gear 1. The torque (rotational input) to the crown wheel will be evenly distributed to each of the first 40 and second 50 bevel gears, which in turn transmit their rotational movement to each of the left and right axle respectively attached thereto. The left and right axles are also connected to a left and right wheel of a vehicle wherein the traction (resistive force) on each of the wheels will influence how the torque from the prop shaft is distributed to each axle. The traction on each wheel is a function of the weight pressing down on the wheel and the frictional coefficient of the surface upon which the wheel is contacting.

When the traction of each wheel connected to differential gear 1 is balanced, both bevel gears 40, 50 will be turning synchronously.

As the vehicle turns a corner one of the bevel gears 40 will increase in rotational velocity and the other bevel gear 50 will decrease in rotational velocity by a proportional amount. Assuming that both wheels of the vehicle have similar traction (ie are on similar road surfaces) the pinion gear 31 engaged between the first 40 and second 50 bevel gear will redistribute torque between the two interconnected wheels of the vehicle, as any open differential gear set would. However, if the traction of one of the two wheels was to incrementally change (ie one wheel travels over ice) the traction on the ice bound wheel would drop relative to the non-ice bound wheel. This difference in traction between the wheels will cause an increase in the rotational speed of the bevel gear attached to the axle of the ice-bound wheel, which will then impart a linear motion to the actuator 60, by displacing the engaged cam surfaces along contact zone Z3.

In response to the linear motion of the actuator 60 the fluid pressure will be increased in one of the two galleries 21, 22. As fluid is forced out of one gallery into the next, the rate of flow of the fluid will be restricted by the cross-sectional area of the channel 16. The faster the rate at which fluid is forced through the channel 16 the greater the increase in pressure within the emptying fluid gallery. This pressure increase in the fluid gallery will resist the linear motion of the actuator 60, impeding the rotational velocity of the bevel gear at the contact zone Z1. The reactionary force will, in this manner, continuously and variably stiffen the differential gear 1 upon demand to react to the loss of traction in one of the wheels of the vehicle.

It will be appreciated by persons skilled in the art that numerous variations and modifications may be made to the above-described embodiments, without departing from the scope of the following claims. The present embodiments are, therefore, to be considered in all respects as illustrative and not restrictive.

Unless defined otherwise, all technical and scientific terms used herein have the same meaning as commonly understood by one of ordinary skill in the art to which this invention belongs.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A continuously variable differential gear assembly comprising:
   a pair of rotating bevel gears engaged with one another via a primary pinion gear, each of the bevel gears including a first operating surface; and
   an actuator configured as a hollow sleeve having opposing ends, the opposing ends having respectively a first fluid reservoir and a second fluid reservoir, the first fluid reservoir and the second fluid reservoir being interconnected in a closed system, the hollow sleeve providing a pair of secondary operating surfaces, the pair of rotating bevel gears and the primary pinion gear being housed within the hollow sleeve such that the first operating surfaces of the rotating bevel gears and the secondary operating surfaces of the hollow sleeve are cooperatively engaged, wherein relative rotation between the pair of rotating bevel gears imparts a linear motion to the hollow sleeve driving fluid between the first fluid reservoir and the second fluid reservoir within the closed system thereby varying fluid pressure between the first fluid reservoir and the second fluid reservoir to resist the linear motion of the hollow sleeve and to variably dampen relative motion of the rotating bevel gears to each other.

2. The continuously variable differential gear assembly of claim 1, wherein the first fluid reservoir and the second fluid reservoir are interconnected by a conduit in the closed system and varying pressure between the first and second interconnected reservoirs drives fluid through the conduit to create an impedance to fluid flow between the reservoirs.

3. The continuously variable differential gear assembly of claim 2, wherein the conduit comprises a plurality of channels.

4. The continuously variable differential gear assembly of claim 3, wherein the plurality of channels extend through an outer wall of the carrier.

5. The continuously variable differential gear assembly of claim 1, wherein the first and second operating surfaces are cammed surfaces.

6. The continuously variable differential gear assembly of claim 1, wherein the actuator comprises a first piston and a second piston disposed at the opposing ends of the hollow sleeve, the first piston disposed at a first end of the hollow sleeve and the second piston disposed at a second end of the hollow sleeve.

7. The continuously variable differential gear assembly of claim 6, wherein each of the first and second pistons are respectively housed within the first fluid reservoir and the second fluid reservoir of the pair of interconnected fluid reservoirs.

8. The continuously variable differential gear assembly of claim 7, further comprising a carrier housing the pair of rotating bevel gears, primary pinion pear, and actuator therein, and a first end cap and a second end cap sealing the carrier.

9. The continuously variable differential gear assembly of claim 8, wherein the first fluid reservoir is disposed within the first end cap of the carrier and the second fluid reservoir is disposed within the second end cap of the carrier.

10. The continuously variable differential gear assembly of claim 8, wherein at least one of the first end cap and the second end cap is threadingly engageable with the carrier.

11. The continuously variable differential gear assembly of claim 6, wherein each of the first and second pistons has an H-shaped cross-section configured to house at least one sealing member.

12. The continuously variable differential gear assembly of claim 6, wherein the pistons are substantially the same diameter as the hollow sleeve such that opposing end faces of the hollow sleeve abut the first piston and second piston respectively providing a load path therebetween.

13. The continuously variable differential gear assembly of claim 1, wherein the hollow sleeve is substantially cylindrical to house the pair of rotating bevel gears and the primary pinion gear therein.

14. The continuously variable differential gear assembly of claim 1, wherein a working fluid circulates between the interconnected first and second fluid reservoirs in the closed system.

15. The continuously variable differential gear assembly of claim 14, wherein the working fluid is any one of automatic transmission fluid (ATF), a magnetorheological fluid and an electrorhelolgical fluid.

16. A differential for a motor vehicle, the differential comprising:
a continuously variable differential gear assembly according to claim 1, having a ring gear mounted to the housing of the continuously variable differential gear assembly, wherein the continuously variable differential gear assembly and the ring gear are housed within a differential housing, the ring gear being configured to cooperate with a drive means of the motor vehicle.

17. The continuously variable differential gear assembly of claim 1, wherein the pair of rotating bevel gears is housed within the hollow sleeve such that each of the secondary operating surfaces of the hollow sleeve is located in mating contact with a respective first operating surface of the pair of rotating bevel gears.

18. The continuously variable differential gear assembly of claim 1, further comprising an additional three pinion gears which in combination with the primary pinion gear are meshingly interposed between the pair of rotating bevel gears, equidistantly.

* * * * *